United States Patent [19]
Enomoto

[11] Patent Number: 5,910,278
[45] Date of Patent: Jun. 8, 1999

[54] METHOD FOR MANUFACTURING A BELLOWS

[75] Inventor: Jun Enomoto, Fukushima, Japan

[73] Assignee: Nok Corporation, Tokyo, Japan

[21] Appl. No.: 08/883,076

[22] Filed: Jun. 26, 1997

Related U.S. Application Data

[62] Division of application No. 08/499,254, Jul. 7, 1995, Pat. No. 5,848,617.

[30]        Foreign Application Priority Data

Jul. 8, 1994  [JP]  Japan .................................. 6-180961
Sep. 8, 1994  [JP]  Japan .................................. 6-240554

[51] Int. Cl.⁶ .................................................. B29C 59/02
[52] U.S. Cl. .......................... 264/138; 264/139; 264/274; 264/161; 264/267; 425/129.1
[58] Field of Search ..................... 264/138, 139, 264/274, 161, 154, 267; 425/129.1

[56]             References Cited

U.S. PATENT DOCUMENTS 2,341,556  2/1944  Joy .......................................... 138/121
3,407,102  10/1968  Wilkinson ............................... 138/121

FOREIGN PATENT DOCUMENTS 1 279 424  11/1960  France .
2 142 974  6/1990  Japan .
2 89 872  6/1990  Japan .
503 928  4/1971  Switzerland .

OTHER PUBLICATIONS

Tschacher: "Faltenbälge aus PTFE", In: Gumi, Asbest, Kunststoffe, Jun. 1967, S. 660, 662.

Primary Examiner—Jan H. Silbaugh
Assistant Examiner—Dae Young Lee
Attorney, Agent, or Firm—Jacobson, Price, Holman & Stern, PLLC

[57]             ABSTRACT

A tubular hollow molded body is formed with a resin having a bending resistance; the hollow molded body is inserted into a mold; a resin with less stress relaxation is injected into both ends of the hollow molded body through a connecting path to mold a bellows intermediate; the resin moved into the connecting path of the bellows intermediate is removed; and a cut is put in the hollow molded body to mold a bellows portion.

4 Claims, 12 Drawing Sheets

METHOD FOR MANUFACTURING A BELLOWS

This is a division of application Ser. No. 08/499,254 filed Jul. 7, 1995, now U.S. Pat. No. 5,848,617.

TECHNICAL FIELD

The present invention relates to resin bellows used for, for example, various kinds of control valves, pressure regulators, pumps, pressure switches and the like, and a method for manufacturing the same.

PRIOR ART

Conventional resin bellows of this kind so far known is as shown in FIG. 18.

This bellows is of a composite construction in which a bellows portion 200 constituting an expansible first resin portion, and a flange portion 201 and a bottom portion 202 constituting a second resin portion at opposite ends of the bellows portion 200 are connected to each other.

The second flange portion 201 and the bottom portion 202 are integrally connected to an outer periphery at one end and to an inner periphery at the other end, respectively, of the bellows portion 200, connection surface of which is provided with a diametral groove 203 and a diametral protrusion 204 which are engaged with each other in a concavo-convex manner for a secure connection.

However, in the case of the above-described prior art, since the flange portion 201 and the bottom portion 202 are merely connected to the inner and outer diametral sides of the bellows portion 200, there existed a problem in that there occurs a clearance between the connection surfaces of the bellows portion 200 and the flange portion 201 and the bottom portion 202 due to a difference in thermal expansion between the bellows portion 200 and the flange portion 201 and the valve portion 202, and a difference in swell characteristics caused by using atmosphere fluid of gasoline, water or the like, deteriorating seal characteristics of fluid inside the bellows.

Particularly, PTFE resin used for the bellows portion 200 is excellent in bending resistance and is an optimum material for the bellows portion 200 but is poor in adhesion between the bellows portion 200 and other members, posing a problem in sealing property.

In the case of the above-described prior art, since a fixed portion 201 and the valve portion 202 constituting the bellows are divided into both ends of the bellows portion 200, when the bellows is molded, two injecting holes, one on the fixed portion 201 side and the other on the valve portion 202 side, for injecting a molding material into a cavity of a mold are required, though not shown, making the mold construction complicated, and thereby deteriorating the manufacturing property.

Further, the fixed portion 201 and the valve portion 202 are merely present on the outer peripheral side or the inner peripheral side of the bellows portion 200. Therefore, in the event that a diametral clearance occurs in a boundary portion of a concave portion 203 which is a loose-proof engaging portion, a leak from the interior to the exterior of the bellow occurs.

SUMMARY OF THE INVENTION

A further object of the present invention is to provide a method for manufacturing bellows which can facilitate the manufacture and can improve the sealing property by simplifying the construction of a mold.

Another object of the present invention is to provide a resin bellows in which the construction between connecting surfaces between a first resin portion and a second resin portion is devised to thereby enhance the sealing property within the bellows.

According to bellows of the present invention, there comprises a first expansible resin portion molded in a bellows form and a second resin portion different from the first resin portion integrally connected to at least one end of the first resin portion, the second resin portion being connected so as to hold an inner diametral side and an outer diametral side of the first resin portion.

There are provided, between connecting surfaces of a first resin portion and a second resin portion, a radial engaging groove and an engaging protrusion which are radially engaged with each other to control an axial relative displacement, and an axial engaging groove and an engaging protrusion which are axially engaged with each other to control a diametral relative displacement.

A first resin portion and a second resin portion are molded of resin material different in swell characteristics caused by using atmosphere fluid, a recess is provided in a member smaller in swell amount out of both said first resin portion and said second resin portion, and an engaging protrusion engaging said recess is provided in a member larger in swell amount.

A recess for keeping a first resin portion at the time of insert molding is partly provided in either inner diametral end or outer diametral end of a connecting surface of a second resin portion with the first resin portion.

In the bellows, the length of the connecting surface is long, and sealing property is improved.

Further, even if the second resin portion is relatively expanded with respect to the first resin portion to form a clearance between the connecting surfaces on the outer diametral side due to a difference in thermal expansion between the first resin portion and the second resin portion and a difference in swell characteristics caused by using atmosphere fluid such as gasoline, water, etc., a pressure of a contact surface of the connecting surface on the inner diametral side increases, whereas even if the second resin portion is relatively contracted with respect to the first resin portion to form a clearance between the connecting surfaces on the inner diametral side, a pressure of a contact surface between the connecting surfaces on the outer diametral side increases not to impair the sealing property.

In the bellows, an axial secure connection of the second resin portion is provided by the provision of the diametral engaging groove and the engaging protrusion. Further, even if there occurs a difference in thermal expansion and a difference in swell amount in a diametral direction between the second resin portion and the first resin portion, a pressure of contact surface of the inner or outer axial contact portion increases so that the sealing property of fluid is maintained. Further, a diametral engaging groove and an engaging protrusion, and an axial engaging groove and an engaging protrusion are provided between the connecting surfaces of the first and second resin portions to thereby prolong the length of the connecting surface and improve the sealing effect.

In the bellows, even if the first and second resin portions are swelled due to the using of atmosphere fluid, the engaging protrusion provided in one having a large swell amount out of the first and second resin portions becomes relatively large within the engaging groove of one having a small swell amount and comes into close contact with the engaging groove to increase the pressure of the contact surface and improve the sealing property.

In the bellows, in the case where the first resin portion is inserted to mold the second resin portion, the second resin portion is held by the first resin portion so that the recess as the trace thereof is positioned at the inner diametral end or the outer diametral end of the connecting surface of the recess, then a seal leak does not likely occur in the middle of the connecting surface to enhance the sealing property.

According to the method for manufacturing bellows of the present invention, the method comprises forming a tubular hollow molded body by way of resin having a bending resistance, inserting said hollow molded body into a mold, injecting a resin with less stress relaxation into both ends of said hollow molded body through a connecting path to mold an intermediate bellows, removing the resin moved into the connecting path of the intermediate bellows, and making a cut in said hollow molded body to mold bellows.

Preferably, secure connection resin engaging portions with less stress relaxation are provided on both ends of the hollow molded body.

Alternatively, the connecting path is positioned on the inner or outer peripheral side of the hollow molded body, and the resin with less stress relaxation is made to flow so as not move into the inner periphery of the hollow molded body.

According to the aforementioned method for manufacturing bellows, since the hollow molded body constituting bellows is inserted into the mold, and the resin with less stress relaxation is injected into both ends through the connecting path to form a fixed portion and a valve portion seen in prior art, one injecting hole for injecting resins into a mold will suffice. Therefore, the construction of the mold can be simplified.

Since the resins can be simultaneously injected into both ends of the hollow molded body through the single injecting hole, the bellows intermediate body can be molded at a stretch, thus facilitating the fabrication.

Further, since the secure connection resin engaging portions of the fixed portion and the valve portion are provided on both ends of the hollow molded body constituting the bellows, the resin comes into engagement with the resin engaging portions during molding, and the fixed portion and the valve portion on the both ends are positively engaged after molding.

Since the connecting path is positioned on the inner peripheral side of the hollow molded body whereby the resin materials injected into the both ends are moved from the inner peripheral side to the outer peripheral side of the hollow molded body including the resin engaging portions, even if a deformation in a diametral direction occurs due to a change in temperature, either inner or outer peripheral resin is brought into engagement with the hollow molded body. Therefore, no leak from the interior to the exterior of the bellows occurs after molding, as a consequence of which the sealing property is enhanced.

Since the connecting path is provided on the outer peripheral side of the hollow molded body so that the resin injected from the outer peripheral side of the hollow molded body into both sides thereof is not moved into the inner peripheral side thereof, the hollow molded body is not spread from the inner peripheral side toward the outer peripheral side by the pressure of the flowing resin. Thereby, it is possible to prevent the hollow molded body inserted into the mold from being deformed.

BRIEF DESCRIPTION OF THE DRAWINGS

FIG. 2b is a sectional view of a valve portion shown in FIG. 2a, and FIG. 2c is a sectional view of a fixed portion shown in FIG. 2a.

DESCRIPTION OF PREFERRED EMBODIMENTS

Figure 1:
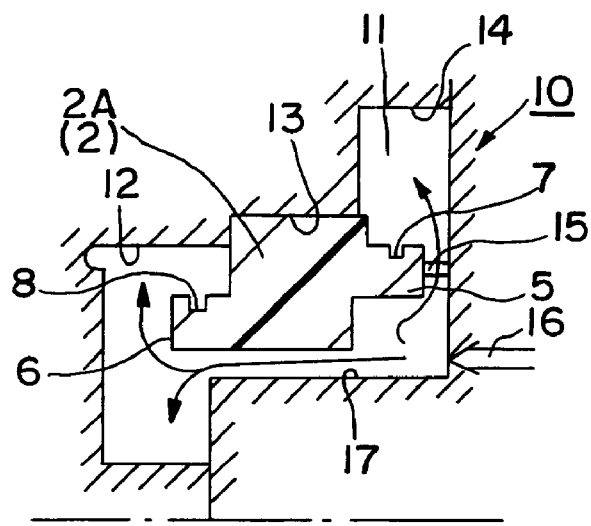
FIG. 1 is a schematic structural view of a mold used for a method for manufacturing bellows according to one embodiment of the present invention.
Figure 2A:
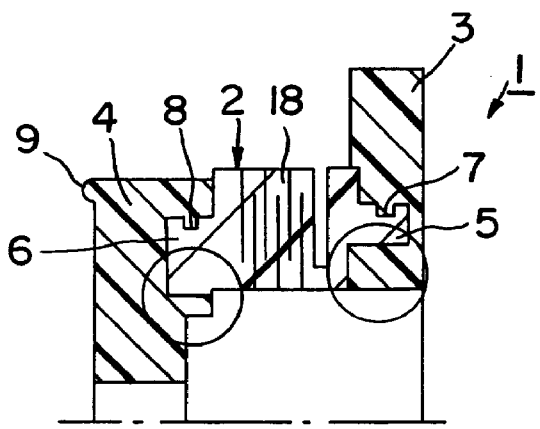
FIG. 2a is a half sectional view of the bellows molded by a mold shown in FIG. 1.
Figure 2B:
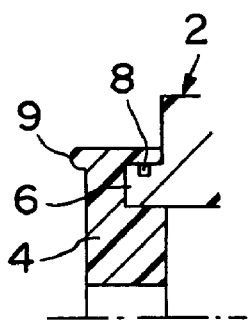
Figure 2C:
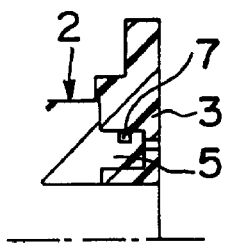

FIG. 1 shows a mold in a bellows manufacturing method according to one embodiment of the present invention, and FIG. 2 shows a bellows as a molded article.

First, the bellows as a molded article shown in FIG. 2 will be described.

This bellows is a bellows with a valve used for a valve device for controlling a flow of fluid and the like, similar to the prior art, which is composed of a tubular bellows portion 2, a fixed portion 3 in the shape of a flange outwardly directed in a diametral direction held on a case (not shown) of the valve device provided at one unbended end of the bellows portion 2, and a valve portion 4 which is moved to and away from a valve seat(not shown) of the valve device in the shape of a flange inwardly directed in a diametral direction provided at the other unbended end of the bellows portion 2.

The bellows portion 2 is formed into a tubular configuration formed of a resin having a bending resistance at a high temperature (approx. 100° C. or more) (for example, tetraethylenefluoride resin, PTFE, etc.), which is formed at one end with a convex portion 5 for a fixed portion having a secure connection resin engaging portion of a fixed portion 3 protruding axially externally of a diametral middle portion and at the other end with a convex portion 6 for a valve portion having a secure connection resin engaging portion of a valve portion 4 protruding axially externally along the inner peripheral surface of the bellows portion 2.

The convex portion 5 for the fixed portion is formed at the outer peripheral surface with a secure connection concave portion 7 (which may be a convex portion) for preventing the fixed portion 3 from being loosened. The convex portion 6 for the valve portion is formed at the outer peripheral surface with a secure connection concave portion 8 (which may be a convex portion) for preventing the valve portion 4 from being loosened.

The fixed portion 3 and the valve portion 4 are molded of resin capable of being injection molded. This resin is a resin whose stress relaxation at a high temperature (approx.100° C. or more) is small. The fixed portion 3 is provided over the entire periphery of the convex portion 5 for the fixed portion at one end of the bellows portion 2 including the secure connection concave portion 7 and is in the shape of a flange outwardly directed in a diametral direction. The valve portion 4 is provided over the entire periphery including the secure connection concave portion 8 on the convex portion 6 for the valve portion at the other end of the bellows portion 2 and is in the shape of a flange inwardly directed in a diametral direction, a rod not shown being mounted fluid tightly within the inner peripheral surface thereof. The valve portion 4 is formed at the peripheral edge of the outer end thereof with an annular valve portion 9, which is moved to and away from a valve seat, protruded axially externally.

Next, the method for manufacturing the above-described bellows 1 will be described by way of a mold shown in FIG. 1. This mold 10 is configured that a hollow molded body 2A constituting the bellows portion 2 is inserted into an annular cavity 11, the resin is injected into the cavity 11, and the fixed portion 3 and the valve portion 4 are injection molded on both ends of the hollow molded body 2A constituting the bellows portion 2. The cavity 11 is composed, corresponding thereto, of a cavity valve portion (hereinafter called a CAV valve portion) 12, a cavity bellows portion (hereinafter called a CAV bellows portion) 13, and a cavity fixed portion (hereinafter called a CAV fixed portion)14 in order from the left-hand in the figure, all of which are annular.

Outside diameters of the CAV valve portion 12, the CAV bellows portion 13 and the CAV fixed portion 14 are small, medium and large diameters in order, and with respect to inside diameters thereof, inside diameters of the CAV bellows portion 13 and the CAV fixed portion 14 are nearly the same, and that of the CAV valve portion 12 is smaller than that of them.

A tubular hollow molded body 2A formed of resin having a bending resistance is inserted into the thus configured cavity 11. The tubular hollow molded body 2A constitutes the bellows portion 2 and is provided at one end with a convex portion 5 for a fixed portion having a secure connection concave portion 7 in its outer peripheral surface and at the other end with a convex portion 6 for a valve portion having a secure connection concave portion 8 in its outer peripheral surface.

The hollow molded body 2A is inserted in such a way that while there is maintained a predetermined diametral gap between the inner peripheral surface of the hollow molded body 2 and the peripheral surface on the inside-diameter side of the CAV bellows portion 13, the outer peripheral surface of the hollow molded body 2A is brought into close contact with the peripheral surface on the outside-diameter side of the CAV bellows portion 13, and the end of the convex portion 5 for the fixed portion is pressed by a plurality of protrusions 15 provided at equal intervals on the circumference in the middle portion in the diametral direction of the end of the CAV fixed portion 14 so that the end on the side of the convex portion 6 for the valve portion 6 of the hollow molded portion 2 comes into close contact with the end of a shoulder between the CAV valve portion 12 and the CAV bellows portion 13.

A gate 16 (indicated at a void arrow in the figure) as an injecting hole which opens to the cavity 11 for injecting the resin into the cavity facing to the inside diameter side of the convex portion 5 for the fixed portion of the inserted hollow molded body 2A is formed in the mold 10.

The molding will be described hereinafter.

First, in the state where the hollow molded body. 2A is inserted into the cavity 11, the resin with less stress relaxation capable of being injection molded is injected from the gate 16. The thus injected resin is allowed to flow from the inside diameter side of the convex portion 5 for the fixed portion into the outside diameter side thereof through the gap of a portion of the protrusion portion 15. On the other hand, since the predetermined diametral gap is formed between the inner peripheral surface of the hollow molded body 2A and the peripheral surface on the inside diameter side of the CAV bellows portion 13, the resin injected from the gate 16 through the gap flows toward the CAV valve portion 12, and turns around the end of the convex portion 6 for the valve portion, after which the resin flows from the inside diameter side to the outside diameter side. In this manner, the fixed portion 3 and the valve portion 4 are injection molded through the gap on the inner peripheral side of the hollow molded body 2A to mold a bellows intermediate (not shown). Accordingly, the aforementioned gap constitutes a connecting path 17 for a flowing resin between the CAV fixed portion 14 and the CAV valve portion 12.

As described above, the bellows intermediate is molded. After this, the mold 10 is released, and the resin moved into the connecting path 17 of the released bellows intermediate is cut and removed together with the inner peripheral surface of the hollow molded body 2A. At this time, the inner peripheral surface of the convex portion 6 for the valve portion is also somewhat cut Also after the cutting, the resins remain (indicated at ◯ in the figure) on the inner peripheral surfaces of the convex portion 5 for the fixed portion and the convex portion 6 for the valve portion having the secure connection concave portions 7 and 8. Thereafter, the inner and outer peripheral surfaces of the hollow molded body 2A are alternately cut to form a bended portion 18 to thereby mold the bellows portion 2 to complete the bellows 1.

According to the above-described method for manufacturing bellows, since the connecting path 17 is provided between the CAV fixed portion 14 and the CAV valve portion 12 within the cavity 11 of the mold 10, one gate 16 for injecting the resin into the cavity 11 when the fixed portion 3 and the valve portion 4 are molded will suffice, and therefore, the construction of the mold 10 is simplified as compared with the prior art which requires two of them.

Further, since the resins are simultaneously injected into both ends of the hollow molded body 2A by a single gate 6, the bellows intermediate can be molded at a stretch, thus facilitating the fabrication.

Furthermore, the fixed portion 3 and the valve portion 4 formed of resin with less stress relaxation on both ends of the bellows portion 2 formed of the resin having a bending resistance are engaged around the inner and outer peripheries of the convex portion 5 for the fixed portion and the convex portion 6 for the valve portion through the secure connection portions 7 and 8 having the outer peripheral surface. Therefore, even if a deformation in a diametral direction occurs due to the change in temperature, they engage either inner or outer peripheral side without the gap, and so a leak in a boundary between the convex portion 5 for the fixed portion and the fixed portion 3, and between the convex portion 6 for the valve portion and the valve portion 4 can be prevented. In the valve portion 4, no leak from the interior to the exterior of the bellows 1 occurs, thus improving the sealing property.

Since the fixed portion 3 and the valve portion 4 were molded of resin with less stress relaxation, it is possible to improve the durability (anti-compression creeping property) in using the bellows 1.

Further, only the bellows portion 2 is formed of resin having a bending resistance, and the fixed portion 3 and the valve portion 4 are manufactured with resin capable of being injection molded, thus rendering the fabrication of an inexpensive bellows possible.

The following molded body 2A and the resin by which the fixed portion 3 and the valve portion 4 are injection molded with the secure connection concave portions 7 and 8 are mechanically fixed. In the present embodiment, however, the secure connection concave portions 7 and 8 are provided in the outer peripheral surface, and thus the present embodiment has an effect in that processing can be made at a stretch by an outer peripheral profile and a general bit. This is because of the fact that a molding contract of resin utilized to produce an interference (that is, stress corresponding to a shrink fitting) in the hollow molded body 2A, and a sealing property at its boundary portion is secured.

Figure 3:
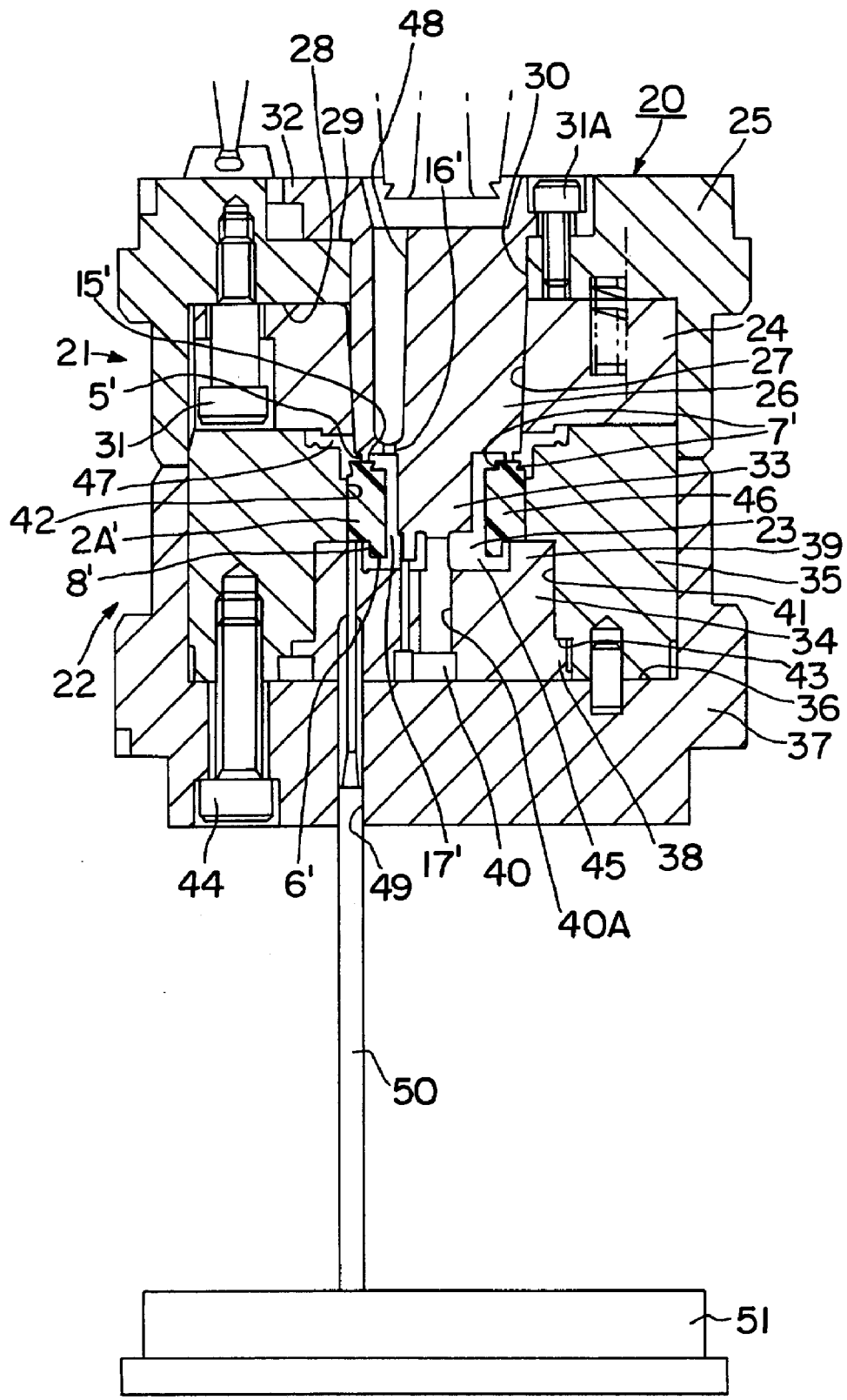
FIG. 3 is a sectional view of a specific mold used for the method for manufacturing bellows according to one embodiment of the present invention.

A specific example of a mold in the above-described manufacturing method according to one embodiment of the present invention will be described below with reference to FIG. 3.

This mold 20 is for injection molding and generally comprises a male die 21 and a female die 22, and cavity 23 is formed between mating surfaces of the male die 21 and the female die 22.

The male die 21 is composed of first, second and third male dies 24, 25 and 26. The first male die 24 is annular, whose inner peripheral surface has a tapered hole 27 in the form of a tapered surface reduced in diameter axially and downwardly.

The second male die 25 has a recess 28 for the first male die into which the first male die 24 is inserted into one axial end, and a recess 29 for the third male die in which the third male die 26 engages the other end and has a communication hole 30, which has nearly the same diameter as that on the large diameter side of the tapered hole 27 of the first male die 24, to provide a communication between the recesses 28 and 29.

The first male die 24 is inserted into the recess 28 for the first male die of the second male die 25 so that the large diameter side of the tapered hole 27 is located on the side of the communication hole 30, and the first male die 24 and the second male die 25 are integrally threadedly fixed by means of a guide screw A31. Since the depth of the recess 28 for the first male die is larger than the thickness of the first male die 24, the outer peripheral portion of the recess 28 for the first male die protrudes downwardly from the end of the first male die 24.

The third male die 26 has at one end a diametrically outwardly directed flange portion 32 and is formed at the other end with a core having a convex portion 33 protruding on the center axis. The third male die 26 is in contact with and inserted into the communication hole 30 and the inner peripheral surface of the tapered hole 27 till it engages the concave portion 29 for the third male die of the second male die 25 out of the first and second male dies 24 and 25 which are integral with each other as mentioned above with the convex portion 33 located downward, and is integrally threadedly secured to the second male die 25 by a guide screw B31A in the flange portion 32 to thereby constitute the male die 21.

On the other hand, the female die 22 is composed of the male die 21, first and second female dies 34, 35 formed with the cavity 23, a third female die 37 having a recess 36 for the first and second female dies into which the first and second female dies 34 and 35 are inserted.

The first female die 34 is rectangular in section having at one end a diametrically outwardly directed flange portion 38 and at the other end an annular convex portion 39 protruding along the outer peripheral surface, while a pin hole 40A into which a pin 40 is inserted extends through a center axis of the die. The extreme end of the pin 40 protrudes from the end of the first female die 34, and the extreme end of the pin 40 comes into contact with the end of the convex portion 33 of the third male die 26 when the male die 21 fits to the female die 22.

The second female die 35 has a recess 41 for the first female die into which the first female die 34 is inserted, and has a hole 42 for the cavity whose inside diameter is large, medium and small in order from the top, which extends through nearly the center of the recess 41 for the first female die, the second female die 35 itself having the outside diameter which is substantially the same as the inside diameter of the recess 28 for the first male die of the second male die 25.

Further, the open end of the recess 41 for the first female die of the second female die 35 has a shoulder 43 in engagement with the flange portion 38 of the first female die 34. The first female die 34 is inserted together with the pin 40 into the first female die 41 of the second female die 35 so that the end of the annular convex portion 39 of the first female die 34 comes in contact with the bottom surface of the recess 41 for the first female die, the flange portion 38 engages the shoulder 43 and the first female die 34 assumes the same plane as the second female die 35. At this time, the inside diameter of the annular convex portion 39 of the first female die 34 is smaller than the diameter of the small diameter portion of the hole 42 for the cavity.

The first and second female dies 34 and 35 thus mounted are inserted into the recess 36 for the first and second female dies of the third female die 37 with the first female die 34 located downward, and the second female die 35 and the third female die 37 are threadedly fixed by a guide screw C44 at the bottom of the recess 36 for the first and second female dies whereby the first, second, third female dies 34, 35 and 37 become integral to form the female die 22. The depth of the recess 36 for the first and second female dies is smaller than the thickness of the second female die 35, and the outside diameter of the second female die 35 is nearly the same as the inside diameter of the recess 28 for the first male die. Further, since the outer peripheral portion of the recess 28 for the first male die protrudes, the extreme end of the second female die 35 is inserted into the recess 28 for the first male die, and the end of the first male die 24 is fitted to the end of the second female die 35 so that the male die 21 and the female die 22 are subjected to the spotting.

At this time, the convex portion 33 of the third male die 26 is inserted into the hole 42 for the cavity of the second female die 35, and the end of the convex portion 33 is brought into contact with the end of the pin 40. Thereby, the annular cavity 23 is formed.

This cavity 23 is composed of a CAV valve portion 45 formed by the inner peripheral surface of the annular convex portion 39 of the first female die 34, the end of the first female die 34 within the annular convex portion 39, the outer peripheral surface of the pin 40 and the end of the convex portion 33 of the third male die 26; a CAV bellows portion 46 formed by the end of the annular convex portion 39 of the first female die 34, the inner peripheral surface of the small diameter portion of the hole 42 for the cavity of the second female die 35, and the outer peripheral surface of the convex portion 33 of the third male die 25; and a CAV fixed portion 47 formed by the inner peripheral surface of the medium and large diameter portions of the hole 42 for the cavity of the second female die 35 and the end therebetween, the end of the first male die 24, the outer peripheral surface of the third male die 24, the end with the convex portion 33 thereof and the outer peripheral surface of the convex portion 33.

A tubular hollow molded body 2A' formed of resin having a bending resistance is then inserted into the cavity 23. This tubular hollow molded body 2A' forms a bellows portion 2' later, one end of which is provided with a convex portion 5' for a fixed portion having a secure connection recess 7' as a resin engaging portion in inner and outer peripheral surfaces and the other end of which is provided a convex portion 6' for a valve portion having a secure connection concave portion 8' as a resin engaging portion in the outer peripheral surface.

The hollow molded body 2A' is inserted in such a manner that while maintaining a predetermined diametral gap, that is, a connecting path 17', between the inner peripheral surface of the hollow molded body 2A' and the outer peripheral surface of the convex portion 33 of the CAV bellows portion 46, the end of the convex portion 5' for the fixed portion is pressed by a plurality of protrusions 15' provided at equal intervals on the circumference in a diametral middle portion of the end of the convex portion 33 of the third male die 26 of the CAV fixed portion 47 so that the outer peripheral surface of the hollow molded body 2A' is brought into close contact with the inner peripheral surface of the small diameter portion of the hole 42 for the cavity of the CAV bellows portion 46 and the side end of the convex portion 6' for the valve portion of the hollow molded portion 2A' comes into close contact with the annular convex portion 39 of the first female die 34 of the CAV bellows portion 46.

On the other hand, the third male die 26 is formed with a gate 16' and a spool 48 as an injection hole which opens to the cavity 23 for injecting the resin into the cavity 23 facing to the inside diameter side of the convex portion 5' for the fixed portion of the hollow molded body 2A' inserted, and a spool 48.

Further, the first female die 34 and the third female die 37 have a hole 49 for an ejector pin which opens the end of the hollow molded body 2A' inserted into the cavity 23 extending therethrough. An ejector pin 50 is reciprocatingly inserted into the hole 49 for the ejector pin, and an ejector plate 51 is provided at the lower end of the ejector pin 50.

The molding in the mold 20 having the above-described construction will be described hereinafter.

First, in the state where the hollow molded body 2A'is inserted into the cavity 23, the resin with less stress relaxation capable of being injected is injected from the gate 16'. The thus injected resin flows from the inside diameter side of the convex portion 5' for the fixed portion to the outside diameter side thereof through the gap of a protrusion 15' portion. The resin injected from the gate 16' flows toward the CAV valve portion through the connecting path 17' on the inner peripheral side of the hollow molded body 2A'. The flowing resin turns around the convex portion 6' for the valve portion and flows from the inside diameter side to the outside diameter side. In this manner, the fixed portion 3' and the valve portion 4' are injection molded through the connecting path 17' on the inner peripheral side of the hollow molded portion 2A', and the bellows intermediate (not shown) is molded.

Figure 4:
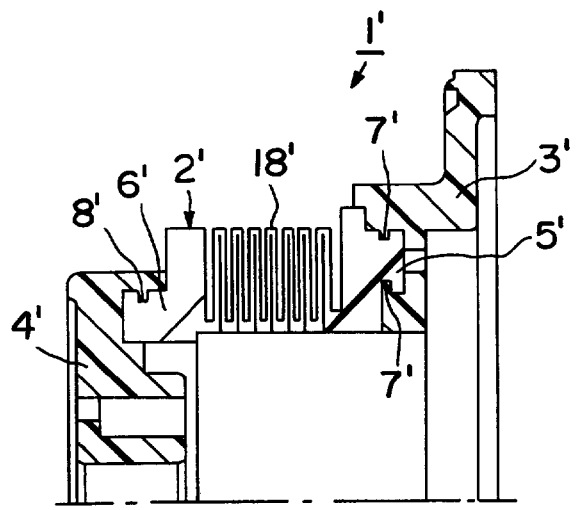
FIG. 4 is a half sectional view of the bellows molded by a mold shown in FIG. 3.

The bellows intermediate is molded as described above. Thereafter, the male die 21 is released from the female die 22, and after release, the ejector plate 50 is pushed to remove the bellows intermediate by the ejector pin 49. And, the resin moved into the connecting path 17' of the bellows intermediate is cut and removed together with the inner peripheral surface of the intermediate molded body 2A'. Also after cutting, the resin is left on the inner peripheral surfaces of the convex portion 5' for the fixed portion having the secure connection concave portions 7'and 8 and the concave portion 6' for the valve portion. Then, the inner and outer peripheral surfaces of the hollow molded body 2A' are alternately cut to form the bended portion 18' to constitute the bellows portion 2', thus completing the bellows 1' (see FIG. 4).

In the bellows 1', the secure connection concave portion 7' is provided in the inner and outer peripheries of the convex portion 5' for the fixed portion, and so, the fixed portion 3' is further difficult to be loosened.

Figure 5:
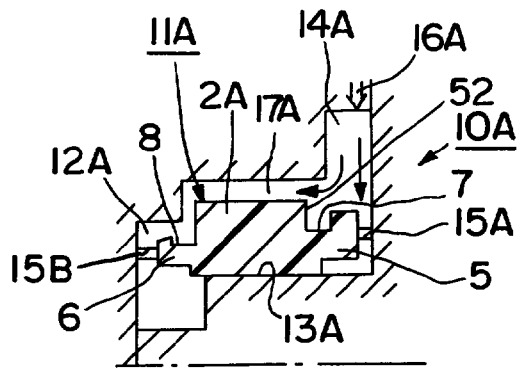
FIG. 5 is a schematic structural view of a mold in another mode according to the embodiment shown in FIG. 1.

Next, the method for manufacturing bellows in another form of the above-described embodiment will be described with reference to FIG. 5. This manufacturing method uses a mold 10A, for molding, having a cavity 11A with a connecting path 17A located on the outer peripheral side of a hollow molded body 2A.

First, the cavity 11A formed by the mold 10A will be described.

The cavity 11A is annular similar to the above-described embodiment, and comprises a CAV valve portion 12A, a CAV bellows portion 13A, and a CAV fixed portion 14A in order from the left-hand in the figure. Outside diameters of the CAV valve portion 12A, the CAV bellows portion 13A and the CAV fixed portion 14A are small, medium and large in order, and with respect to inside diameters, the CAV bellows portion 13A has substantially the same diameter as that of the CAV fixed portion 14A and the CAV valve portion 12A is smaller in diameter than that.

The hollow molded body 2A is inserted into the cavity 11A. That is, the hollow molded body 2A is inserted such that the outer peripheral surface of the hollow molded body 2A is made to be a connecting path 17A, and the ends of the convex portion 5 for the fixed portion and the convex portion 6 for the valve portion are pressed by a plurality of protrusions 15A provided at equal intervals on the circumference in the middle portion in a diametral direction of the end of the CAV fixed portion 14A and a plurality of protrusions 15B on the circumference in the middle portion in a diametral direction of the end of the CAV valve portion 12A so that the inner peripheral surface of the hollow molded body 2A is brought into close contact with the peripheral surface on the inside diameter side of the CAV bellows portion 13A and the resin is moved into the inner and outer peripheries of the convex portion 5 for the fixed portion and the convex portion 6 for the valve portion of the hollow molded body 2A.

A gate 16A (indicated at a void arrow in the figure) as an injection hole which opens to the cavity 11A for injecting the resin toward the connecting path 17A provided on the external peripheral side of the hollow molded body 2A inserted is opened and formed in the peripheral surface on the outside diameter side of the CAV fixed portion 14A.

And, a bellows intermediate (not shown) is molded through a flowing resin into the connecting path 17A on the outer peripheral side of the hollow molded body 2A (the resin is allowed to flow from the fixed portion 3 to the valve portion 4), and the resin moved into the connecting path 17A of the bellows intermediate and the outer peripheral surface of the hollow molded body 2A is cut and removed, after which the bellows is molded via the step as in the above-described embodiment.

Figure 6:
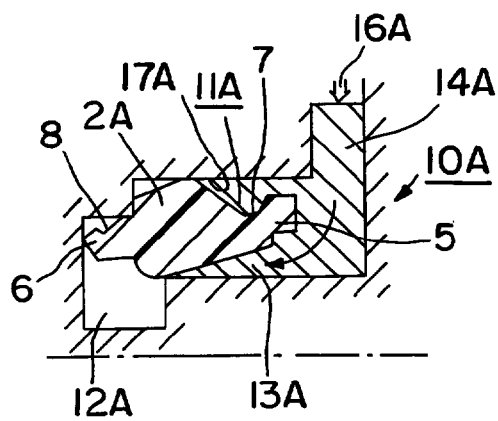
FIG. 6 is a schematic structural view showing the state in which a hollow molded body is deformed by a flowing fluid in the mold shown in FIG. 5.

However, in the case of this manufacturing method, there sometimes occurs the case where when the resin is injected from the gate 16A in order to mold the bellows intermediate, the hollow molded body 2A is pressed toward the outside diameter side of the cavity 11A and becomes deformed by the injection pressure of the resins to a shoulder 52 with the outside diameter of the convex portion 5 for the fixed portion of the hollow molded body 2A, the end of the convex portion 5 for the fixed portion and the inside diameter side of the convex portion 5 for the fixed portion whereby the connecting path 17A is closed failing to accomplish molding. Since the hollow molded body 2A is formed of a material suitable for the bellows portion 2, that is, a material having a low coefficient of elasticity (for example, 5000 kg/cm2 or so) of resin (such as PTFE) having a bending resistance. Therefore, there exists a problem in that the hollow molded body 2A becomes easily permanently deformed (see FIG. 6) and molding property is poor.

The method for manufacturing bellows according to another embodiment of the present invention will be then described in order to solve the aforementioned problem.

Figure 7:
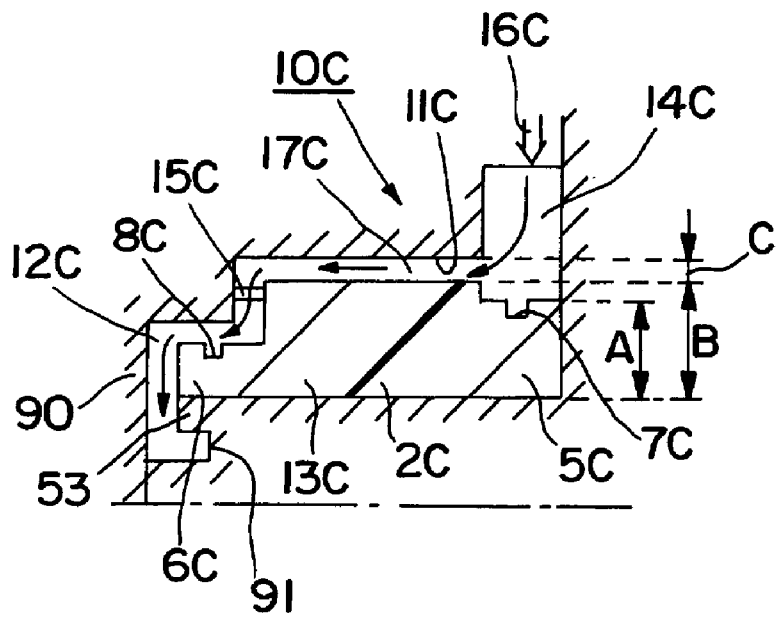
FIG. 7 is a structural view of a mold used for the method for manufacturing bellows according to another embodiment of the present invention.

First, a mold 10C shown in FIG. 7 will be described. This mold 10C is composed of a die 90 and a die 91. A cavity 11C is formed by the die 90 and the die 91. A hollow molded body 2C forming a bellows portion 2C' is inserted into the annular cavity 11C, the resin is injected into the cavity 11C, and a fixed portion 3C and a valve portion 4C are injection molded on both ends of a hollow molded body 2C forming the bellows portion 2C'. The cavity 11C is composed, corresponding thereto, of a CAV valve portion 12C, a CAV bellows portion 13C and a CAV fixed portion 14C in order from the left-hand in the figure, all of which are annular.

Outside diameters of the CAV valve portion 12C, the CAV bellows portion 13C and the CAV fixed portion 14C are small, medium and large in order, and with respect to inside diameters, the CAV bellows portion 13C is substantially the same in diameter and the same plane as that of the CAV fixed portion 14C, the CAV valve portion 12C being smaller in diameter than that.

The tubular hollow molded body 2C formed of resin having a bending resistance is inserted into the thus constructed cavity 11C. The tubular hollow molded body 2C forms the bellows portion 2C' later, one end of which is provided with a convex portion 5C for a fixed portion protruding along the inner peripheral surface of the hollow molded body 2C having a secure connection concave portion 7C in the outer peripheral surface and the other end of which is provided with a convex portion 6C for a valve portion protruding along the inner peripheral surface of the hollow molded body 2C similar to the convex portion 5C for the fixed portion having a secure connection concave portion 8C in the outer peripheral surface.

The hollow molded body 2C is inserted such that the side end of the convex portion 6C for the valve portion of the hollow molded body 2C is pressed by a plurality of protrusions 15C provided at equal intervals on the circumference in the middle portion in a diametral direction of the end of shoulders of the CAV valve portion 12C and the CAV bellows portion 13C of the die 190 so that the hollow molded body 2C has a predetermined diametral gap between the inner peripheral surface of the hollow molded body 2C and the peripheral surface on the outside diameter side of the CAV bellows portion 13C, that is, the inner peripheral surface of the hollow molded body 2C is brought into close contact with the peripheral surface of the inside diameter of the CAV bellows portion 13C through the connecting path 17C on the outer peripheral side of the hollow molded body 2C and the end of the convex portion 5C for the fixed portion of the hollow molded body 2C comes into intimate contact with the end of the die II91 of the CAV fixed portion 14C.

At this time, the die II91 is provided with a support convex portion 53 which protrudes along the peripheral surface on the inside diameter side of the CAV 13c as a support portion in order to prevent the convex portion 6C for a valve portion from buckling and deformation, and the end of the support convex portion 53 is in the same plane with the end of the convex portion 6C for a valve portion.

A gate 16C as an injection hole which opens to the CAV fixed portion 14C of the cavity 11C for injecting the resin toward the connecting path 17C provided on the outer peripheral side of the hollow molded body 2C inserted as described above is formed to be opened to the peripheral surface on the outside diameter side of the CAV fixed portion 14C of the die 190.

Figure 8:
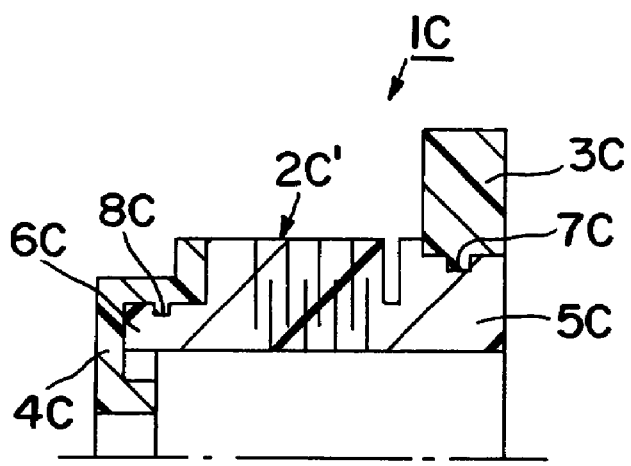
FIG. 8 is a half sectional view of the bellows molded by a mold shown in FIG. 7.

The flowing resin is passed through the connecting path 17C on the outer peripheral side of the hollow molded body 2C (the resin is allowed to flow from the fixed portion 3C to the valve portion 4C) to mold a bellows intermediate (not shown). The resin moved into the connecting path 17C of the bellows intermediate and the outer peripheral surface of the hollow molded body 2C are cut and removed, after which the bellows 1C is molded via the step as in the above-described first embodiment (see FIG. 8).

According to the manufacturing method of this embodiment, the connecting path 17C is provided on the outer peripheral side of the hollow molded body 2C, and the end of the convex portion 5C for a fixed portion of the hollow molded body 2C is placed in close contact with the end of the die II91 of the CAV fixed portion 14C so as to prevent the resin injected from the outer periphery of the hollow molded body 2C into both ends thereof from entering the inner periphery. Therefore, the axial pressure of the flowing resin is hard to be applied so that when the resin is injected, it does not enter the inner periphery of the hollow molded body 2C from the end of the convex portion 5C for a fixed portion. As a result, the hollow molded body 2C is not spread toward the outer periphery from the inner periphery by the pressure of the flowing resin, thus preventing the hollow molded body 2C inserted into the mold 10C from being deformed to improve a molding property.

Preferably, the following dimensions are employed so as to make application of the axial pressure of the flowing resin difficult.

Assuming that C is a sectional area of the connecting path 17C, A is a sectionl area of the convex portion 5C for a fixed portion, and B is a sectional area of the hollow molded body 2C, the sectional area C of the connecting path 17 is preferably B−A≦C. A≧0.7B is also preferable. This is the reason why the pressure of the flowing resin does not greatly exert on the shoulder with the convex portion 5C for a fixed portion, that is, the B-A portion.

By doing so, when the pressure of the flowing resin exerts on the hollow molded body 2C, the pressure exerts on the B-A portion, but by the provision of B−A≦C. the flowing resin can be smoothly flowed to weaken the force for pressing leftward in the figure. Further, since the protrusion 15C of the die 190 can obstruct the leftward (in the figure) movement of the hollow molded body 2C, the hollow molded body 2C can be positively held within the cavity 11C.

Figure 9:
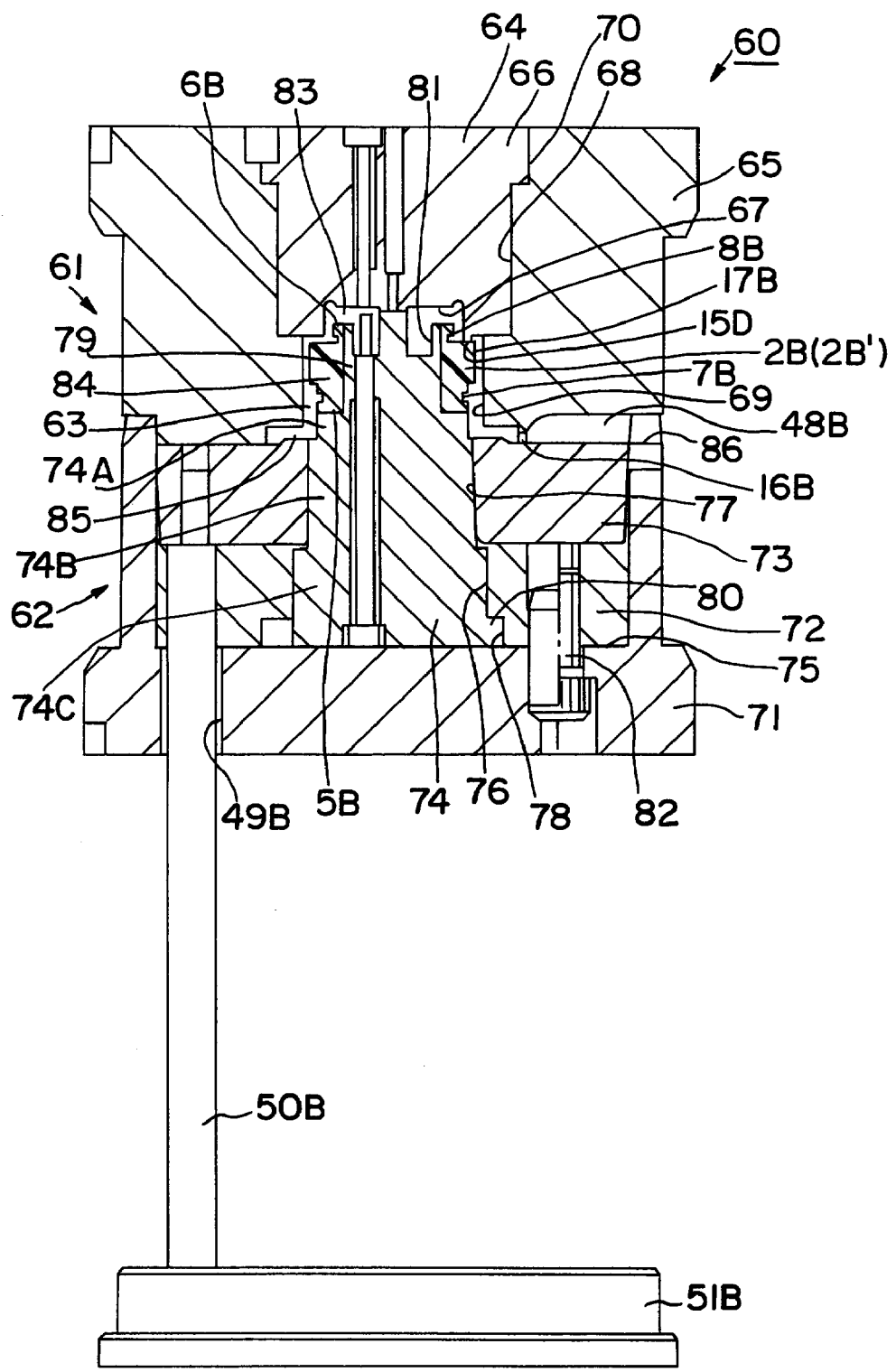
FIG. 9 is a sectional view of a specific mold used for the method for manufacturing bellows according to another embodiment of the present invention.

A specific example of a mold in the manufacturing method according to the aforementioned embodiment will be described hereinbelow with reference to FIG. 9.

This mold 60 is for injection molding, and comprises a male die 61 and a female die 62, and a cavity 63 is formed between mating surfaces of the male die 61 and the female die 62.

The male die 61 is composed of a first male die 64 and a second male die 65.

The first male die 64 is approximately rectangular in section, and has at one end a diametrically outwardly directed flange portion 66 and at the other end a recess for a cavity 67 for forming a cavity 63.

The second male die 65 is an annular member having a recess for the first male die 68 into which is inserted the first male die 64, which has a hole for a cavity 69 whose inside diameter is small and large in diameter in order from the top. The recess for a first male die 68 is formed at its open end with a shoulder 70 in engagement with the flange portion 66 of the first male die 64. The outer peripheral end of the recess for a cavity 67 of the first male die 64 within the recess for a first male die 68 comes in contact with the bottom surface of the recess for a first male die 68, and the flange portion 66 comes in engagement with the shoulder whereby the first male die 64 becomes integral with the second male die 65 to constitute the male die 61.

On the other hand, the female die 62 is composed of first, second, third and fourth female dies 71, 72, 73 and 74. The first female die 71 has a generally U-shape in section having a recess for a female die 75 into which are inserted the first, second, third and fourth female dies 72, 73 and 74. Within the recess for a female die 75 are stacked the annular second and third female dies 72 and 73 in said order, and the fourth female die 74 is inserted into holes 76 and 77 of the second and third female dies 72 and 73 whereby the second, third and fourth female dies 72, 73 and 74 are disposed.

The open end on the bottom side of the recess 75 of the hole 76 of the second female die 72 is formed with a shoulder 78 which is larger in diameter than the former. The hole 77 of the third female die 73 is in a tapered shape which is enlarged in diameter downwardly in the figure, and the diameter at the lower end thereof is somewhat smaller than that of the hole 76 of the second female die 72. With this, when the third female die 73 is stacked on the second female die 72, a shoulder is formed at portions of the hole 76 and the hole 77.

The fourth female die 74 has a convex portion 79 which faces in the hole for a cavity 69 of the second male die 65 to form a core inserted into the holes 76 and 77 of the second and third female dies 72 and 73, and a diametrically outwardly directed flange portion 80 is provided at the lower end thereof. A portion between the convex portion 79 and the flange portion 80 gradually increased in the outside diameter from the convex portion 79, which is constituted by a tapered portion 74B which is enlarged in diameter toward the flange portion 80 and a large diameter portion 74C. The diameter of the large diameter portion 74C is approximately the same as that of the hole 76 of the second female die 72, and the tapered portion 74B is approximately the same as the tapered shape of the hole 77 of the third female die 73. The convex portion 79 is formed at the upper end with an annular recess 81, and the height of the outer peripheral portion is lower than the central portion thereof.

The fourth female die 74 is inserted into the hole 76 of the second female die 72 till the flange portion 80 comes into engagement with the shoulder 78 of the second female die 72, and keeping the state, inserted into the recess for a female die 75 of the first female die 71. After insertion, the first female die 71 and the second female die 72 are threadedly fixed by a guide screw D82 to make the first, second, and fourth female dies 71, 72 and 74 integral, and the tapered hole 77 of the third female die 73 is inserted into the tapered portion 74B of the fourth female die 74 and inserted into the recess for a female die 75 and stacked on the second female die 72 to constitute the female die 62. At this time, the small diameter portion 74A of the fourth female die 74 protrudes from the end of the third female die 73, and the end of the third female die 73 is lower than the outer peripheral end of the recess 75 for a female die of the first female die 71.

The end of the second male die 65 of the male die 63 is placed in contact with and fitted to the end of the third female die 73 of the female die 62, and the male die 61 and female die 62 are subjected to spotting.

At this time, the convex portion 79 of the fourth female die 74 and the small diameter portion 74A are faced and inserted into the hole 69 for a cavity of the second male die 65, and the end in the central portion of the convex portion 79 having the annular recess 81 is brought into contact with the bottom surface of the recess for a cavity 67 of the first male die 64. Thereby, the annular cavity 63 is formed.

The cavity 63 is composed of a CAV valve portion 83 formed by the recess for a cavity 67 of the first male die 64 and the annular recess 81 of the convex portion 79 of the fourth male die 64; a CAV bellows portion 84 formed by the outer peripheral end of the recess for a cavity 67 of the first male die 64, the inner peripheral surface of a small diameter portion of the hole 69 for a cavity of the second male die 65 and the outer peripheral surface of the convex portion 79 of the fourth female die 74; and a CAV fixed portion 85 formed by the inner peripheral surfaces of small and large diameter portions and end therebetween of the hole 69 for a cavity of the second male die 65, the end of the third female die 73 and the peripheral surface of the small diameter portion 74A of the fourth female die 74.

Into the cavity 63 is inserted a tubular hollow molded body 2B formed by a resin having a bending resistance. This tubular hollow molded body 2B forms a bellows portion 2B' later, one end of which is provided with a convex portion 5B for a fixed portion protruding along the inner peripheral surface of the hollow molded body 2B having a secure connection recess 7B in the outer peripheral surface as a resin engaging portion, and the other end of which is provided with a convex portion 6B for a valve portion protruding along the inner peripheral surface of the hollow molded body 2B similar to the convex portion 5B for a fixed portion having a secure connection recess 8B in the outer peripheral surface as a resin engaging portion.

There is a predetermined diametral gap between the outer peripheral surface of the hollow molded body 2B and the inner peripheral surface of a small diameter portion of the hole 69 for a cavity of the second male die 65 of the CAV bellows portion 84 of the cavity 63, that is, a connecting path 17B on the outer peripheral side of the hollow molded body 2B. The hollow molded body 2B is inserted such that the end of the convex portion for a valve portion 6B of the hollow molded body 2B is pressed by a plurality of protrusions 15D provided at equal intervals on the circumference in the diametral middle portion of the end of the outer peripheral portion of the recess 67 for a cavity of the first male die 64 of the CAV valve portion 83 so that the inner peripheral surface of the hollow molded body 2B is brought into close contact with the outer peripheral surface of the convex portion 79 of the fourth female die 74 of the CAV bellows portion 84, and the end of the convex portion 5B for a fixed portion of the hollow molded body 2B is brought into close contact with the end between the small diameter portion of the fourth female die 74 of the CAV bellows portion 84 and the convex portion 79.

On the other hand, between the second male die 65 and the third female die 73 is formed a spool 48B through a gate 16B as an injection hole which opens to the cavity 63 for injecting the resin into the cavity 63 facing to the outside diameter side of the convex portion 5B for a fixed portion of the hollow molded body 2B inserted and a slit of the first female die 71.

Further, there is a hole for an ejector pin 49B having a large, medium and small diameter which coaxially extends through the first, second, and third female dies 71, 72 and 73. An ejector pin 50B with a shoulder is inserted into the hole 49B for an ejector pin so that it can be reciprocated within the first and second female dies 71 and 72, and comes into contact with the lower end of the third female die 73 at the end of the shoulder of the ejector pin 50B. An ejector plate 51B is provided at the lower end of the ejector pin 50B.

The molding by way of the mold 60 constructed as described above will be described hereinafter.

First, in the state where the hollow molded body 2B is inserted into the cavity 63, the resin with less stress relaxation capable of being injection molded is injected from the gate 16B. The thus injected resin flows from the outside diameter side of the convex portion 5B for a fixed portion toward the CAV valve portion 83 through the connecting path 17B on the outer peripheral side of the hollow molded body 2B, flows along the outside diameter side of the convex portion 6B for a valve portion through a gap of the protrusion 15D portion, and flows into the annular recess 81 from the outside diameter side turning around the convex portion 6B for a valve portion. In this manner, the fixed portion 3B and the valve portion 4B are injection molded through the connecting path 17B on the outer peripheral side of the hollow molded body 2B to mold a bellows intermediate (not shown).

Figure 10:
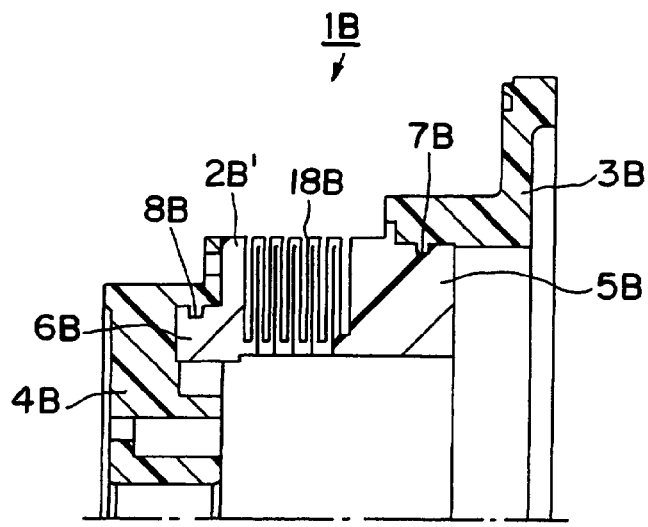
FIG. 10 is a half sectional view of the bellows molded by a mold shown in FIG. 9.

In this manner, the bellows intermediate is molded. Thereafter, the male die 61 is released from the female die 62, and after release, the ejector plate 51B is pressed to remove the bellows intermediate by pressing the third female die 73 with the end of the shoulder of the ejector pin 50B. The resin moved into the connecting path 17B of the bellows intermediate is then cut and removed together with the outer peripheral surface of the intermediate molded body 2B. After cutting, the resin is left on the outer peripheral surfaces of the convex portion 5B for a fixed portion and the convex portion 6B for a valve portion. The inner and outer peripheral surfaces of the hollow molded body 2B are alternately cut to form a bended portion 18B to constitute a bellows portion 2B', thus completing a bellows 1B (see FIG. 10).

Figure 11A:
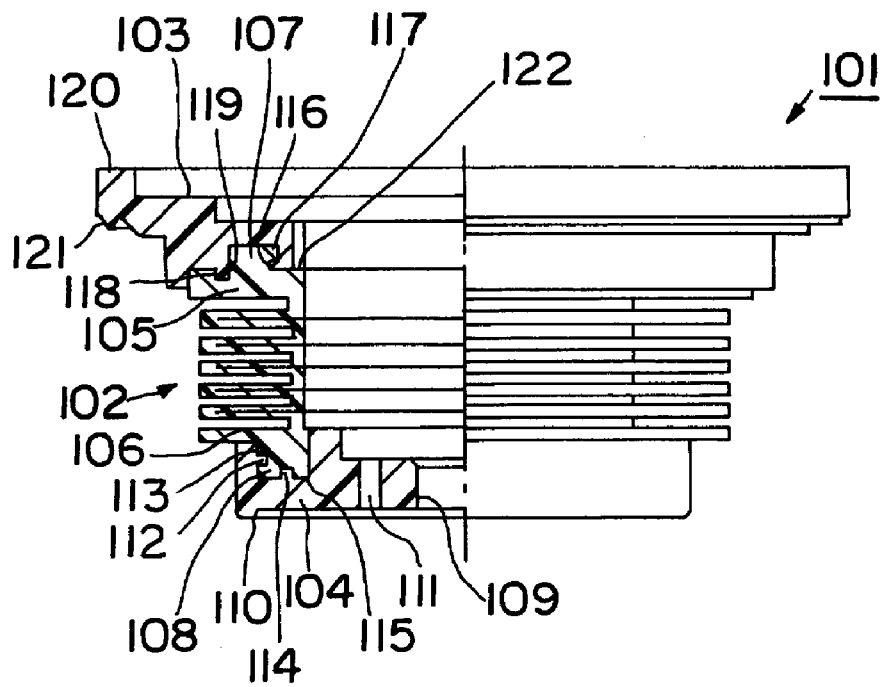
FIG. 11a is a half longitudinal sectional view showing resin bellows according to one embodiment of the present invention.
Figure 11B:
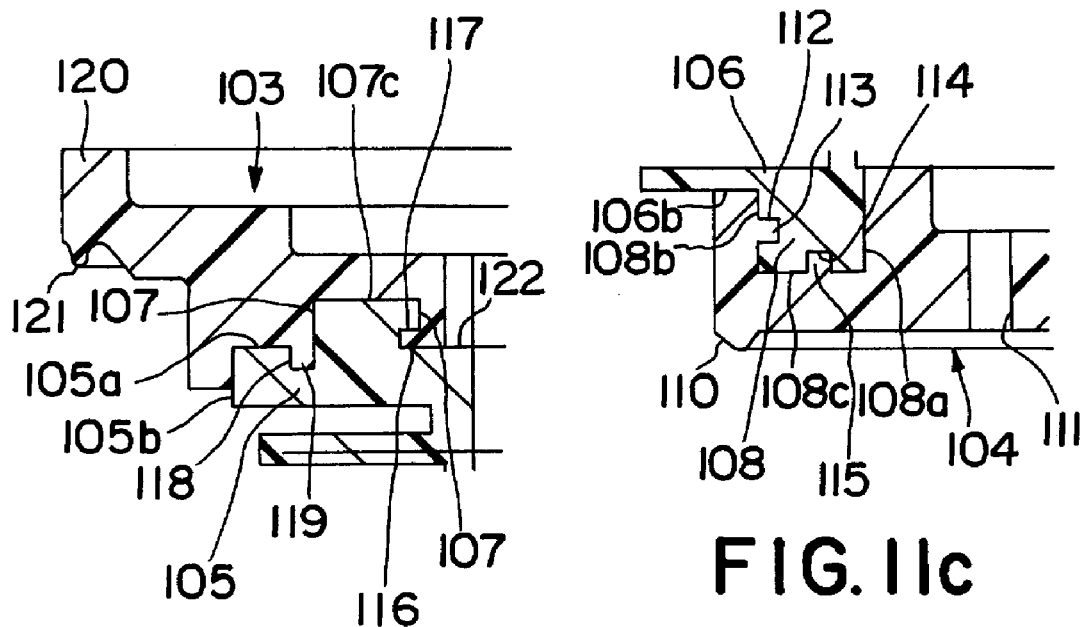
FIG. 11b is an enlarged sectional view of a flange portion of the bellows.
Figure 11C:
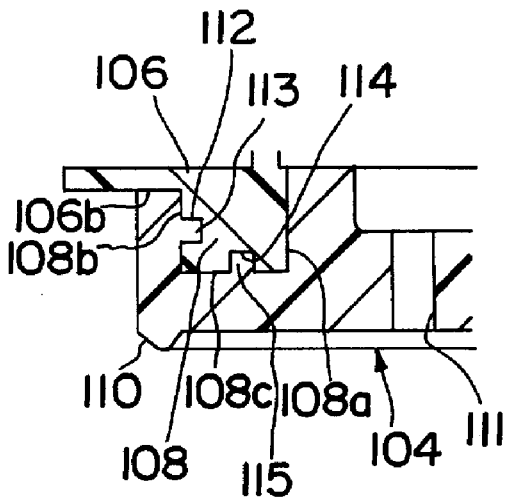
FIG. 11c is an enlarged sectional view of a valve portion of the bellows.
Figure 12A:
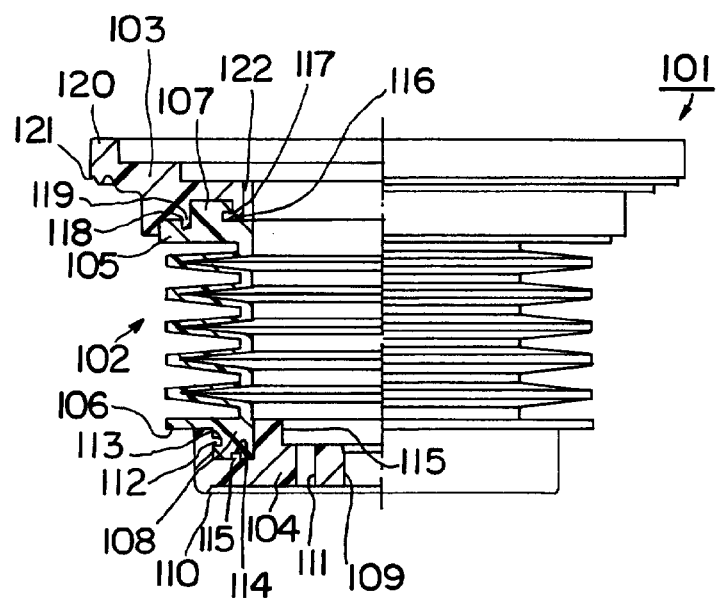
FIG. 12a is a half longitudinal sectional view of the resin bellows in its expanded state shown in FIG. 1a to FIG. 11c, and FIGS. 12b and 12c are half top views of the resin bellows.
Figure 12B:
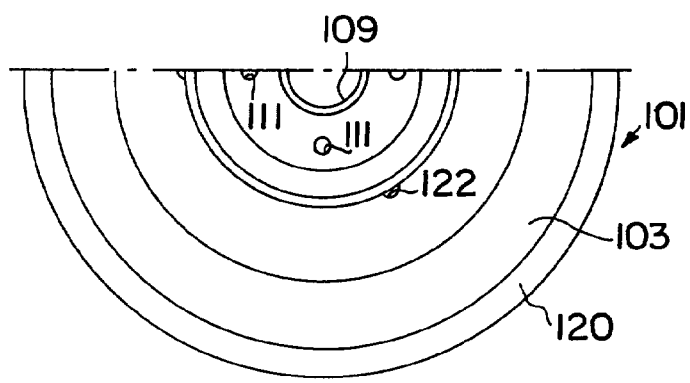

FIGS. 11 and 12 show a resin bellows according to still another embodiment of the present invention.

This resin bellows 101 is a generally closed-end cylindrical member, which comprises a cylindrical bellows portion 102 as a first resin portion expansibly molded, a flange portion 103 on the open side connected to one end of the bellows portion 102, and a valve portion 104 on the bottom side connected to the other end of the bellows portion 102.

The bellows portion 102 is molded of a resin material which is rich in a bending resistance, for example PTFE (tetraethylenefluoride resin), in which the inner peripheral surface and the outer peripheral surface of a thick-wall resin cylindrical body are alternately cut to form it into a bellows-like configuration. In the cut on the outer peripheral side, the wall having a predetermined width is cut away in an axial direction to form an axial space, and in the cut on the inner peripheral side, it is merely cut in the state free from the width, and in the most contracted state, valley portions at the inner diameter end are in close contact with each other as shown in FIG. 11a.

First and second ends 105 and 106 at both axial ends of the bellows portion 102 are provided with first and second convex portions 107 and 108, respectively, for the connection of the flange portion 103 and the valve portion 104. The first convex portion 107 protrudes toward the axial central portion of the end 105 of the bellows portion 102, and the second convex portion 108 for fixing the valve portion 104 protrudes while being deviated to the inner diameter end of the second end 106 of the bellows portion 102.

The flange portion 103 and the valve portion 104 are molded of resin material different from that of the bellows portion 102 and molded by molding such as an injection molding, a transfer molding and the like. That is, the bellows portion 102 is premolded by cutting a stock, and inserted into a mold for insert molding integral with the flange portion 103 and the valve portion 104. The reason why such an insert molding is employed is that a yield of the bellows portion 102 such as PTFE cut from the stock is increased to reduce the cost Further, this resin material is a resin material capable of being molded, and materials according to functions (for example, such as heat resistance, wear resistance, chemicals resistance, etc.) demanded by the flange portion 103 and the valve portion 104 are suitably selected. For example, since it is fixed so as to be sandwiched between both ends of the flange portion 103, a material having a low stress relaxation is preferable. With respect to the valve portion 104, it repeatedly comes into contact with a valve seat, and therefore, a material excellent in the wear resistance is preferable. Accordingly, one kind of resin which meets both demands may be selected or the flange portion 103 may be molded of a resin different from that of the valve portion 104.

Resin materials for injection molding generally include PA (polyamide resin), POM (acetal) and the like. PA is excellent in heat resistance but tends to be swelled with respect to fluids such as fuel, oil, water, alcohol, etc., so that a leak tends to occur from a connected boundary surface with the bellows portion 102, which is a disadvantage. On the other hand, POM is low in heat resistance and is not suitable for parts for which heat resistance is demanded.

In this respect, preferable resin materials are an ester resin and an injectable fluorine resin.

The ester resin has the heat resistance equal to PA and is suitable for the lack of the swelling caused by alcohol and water absorption.

The ester resin has a molecular structure in which molecules such as water and oil are hard to enter between molecules, and is small in change in dimension after a dipping test. Preferable specific examples of ester resins include polybutylene terephthalate (PBT) and polyethylene terephtalate (PET).

The fluorine resin is excellent in chemicals resistance, and hardly absorbs water, and a change in dimension affected thereby is fine. While the change in dimension due to heat occurs, this is a fluorine resin equal akin to the bellows portion 102 made of PTFE, and therefore, the amount of change in dimension is substantially equal thereto, suppressing the formation of a gap in the boundary surface to minimize a leak of fluid such as air.

Preferable specific examples of fluorine resins include PFA (tetrafluoroethylene, perfluoroalkylvinylether-copolymer), ETFE (tetrafluoroethylene ethylene-copolymer), FEP(tetrafluoroethylene-hexafluoropropylene), PUdF(polyfluorovinylidene) and the like.

However, with respect to the swell characteristics of resins, it is possible to increase a pressure of the connecting surface making use of the swell characteristics, in which case PA (polyamide) or the like can be used.

The valve portion 104 is a disk-like member bored with a mounting hole 109 in the central portion thereof, which is provided so as to close an opening of the second end 106 of the bellows portion 102 and secured at the second end 106 so that the second convex portion 108 is embedded. The valve portion 104 is provided at the outer diametral end edge with an annular protrusion 110 in contact with a mating surface of a valve seat, and a plurality of holes 111 are provided in the periphery of the central mounting hole 109.

The second convex portion 108 is rectangular in section and molded into a torus configuration along the end of the bellows portion 102, and the connecting surface between the valve member 104 and the bellows portion 102 has four sides; a side 108a on the inside diameter side of the second convex portion 108, a side 108b and an end 110c on the outside diameter side, and a part of an end 106a of the second end 106 so as to hold the inside diameter side and the outer diameter side of the bellows portion 102.

A diametral groove 112 and a diametral protrusion 113 which are engaged in a diametral direction to each other to control an axial relative displacement are provided between the connecting surfaces on the side of an outside diameter side 108b of the second convex portion 108.

Further, a diametral groove 114 and a diametral protrusion 115 which are engaged in a diametral to direction each other to control an axial relative displacement are provided in the connecting surface on the side of an end 108.

On the other hand, a connecting surface between the flange portion 103 and the bellows portion 102 is also connected so as to hold the sides on the inside diameter side and outside diameter side of the bellows portion 102 to have five sides; a side 107a on the inside diameter side of the first convex portion 107, a side 107b and an end 107 on the outside diameter side 107, and an end 105a of the first end 105 and a side 105b on the outside diameter side.

Further, a diametral groove 116 and a diametral protrusion 117 which are engaged in a diametral direction to each other to control an axial relative displacement are provided in the connecting surface on the side 107a on the inside diameter side. Further, a diametral groove 118 and a diametral protrusion 119 which are engaged in a diametral direction to each other to control an axial relative displacement are provided at the root position on the outside diameter side of the first convex portion.

Further, an annular shoulder portion 120 protruding on the axial side opposite to the bellows portion 102 is provided at the outside diameter end of the flange portion 103, and an annular bead 121 is formed on the surface on the side opposite to the shoulder portion 120.

Further, a keep recess 122 as a trace in which the bellows portion 102 is held within the mold when the bellows portion 102 is subjected to insert molding is provided at the inside diameter end of the flange portion 103. The keep recess 122 is formed after a keep protrusion provided on the mold has been depressed, a plurality of the keep recesses 122 being partly formed in a peripheral direction. The inside diameter side of the keep recess 122 is opened, and the end of the first end 105 of the bellows portion 102 is exposed to the bottom.

The keep position may be provided at the outside diameter end in addition to the inside diameter end of the connecting surface between the flange portion 103 and the bellows portion 102.

While the above-described resin bellows is molded by injection molding, it is to be noted that the injection gate may be divided into two parts, to mold the flange portion 103 and the valve portion 104 by separate cavities, and that in the insert molding, the flange portion 103 may be communicated with the valve portion 104 so as to simultaneously mold them from one gate.

FIG. 13 illustrates a method for manufacturing resin bellows in the embodiment shown in FIGS. 11 and 12.

Figure 13A:
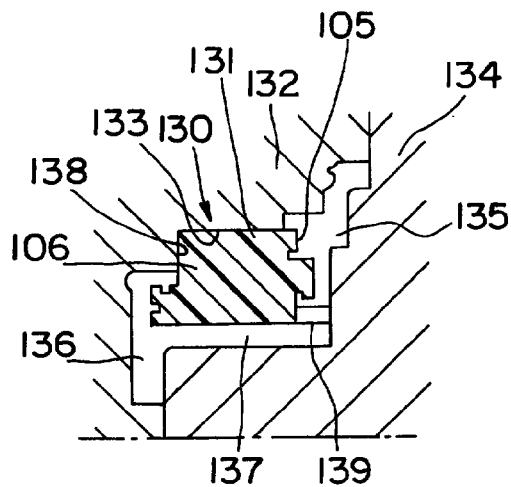
FIGS. 13a through 13f are views showing the molding step of the resin bellows shown in FIGS. 11a to 11c.
Figure 13B:
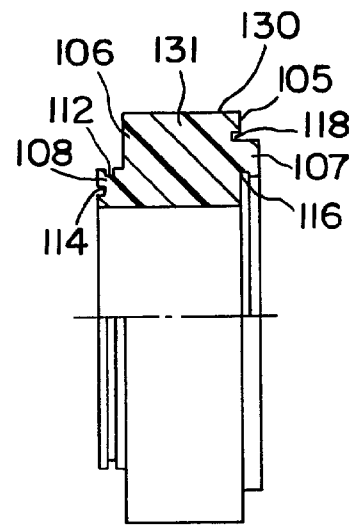
Figure 13C:
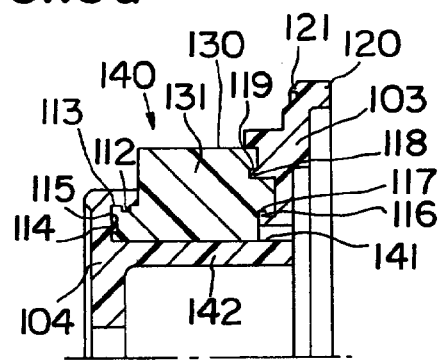
Figure 13D:
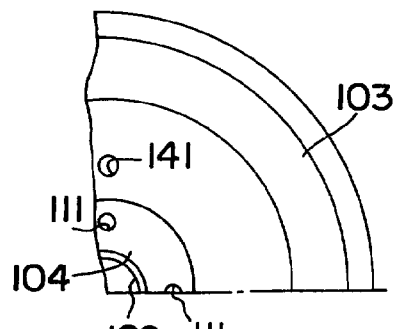
Figure 13E:
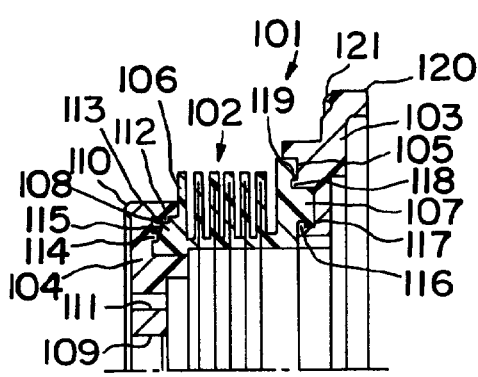

First, as shown in FIG. 13a, a first intermediate molded body 130 before the bellows portion 102 is molded of a resin stock of PTFE. This first intermediate molded body 130 is in the state where the shapes of the first and second ends 105, 106 and the first and second convex portions 107, 108 at both ends of the bellows portion 102 shown in FIG. 13e are molded but a cylindrical portion 131 to be a body is not provided with a bellows-like cut Diametral and axial grooves 112, 114; 116, 118 are formed on the sides of the first and second convex portions 107 and 108, respectively.

The first intermediate molded body 130 is inserted into a recess 133 of a first mold 132 and a second mold 134 is closed to form cavities 135 and 136 corresponding to the flange portion 103 and the valve portion 104 between the first and second ends 105, 106 of the first intermediate molded body 130 and inner wall surfaces of the first and second ends 105, 106. The cavities 135, 136 at both ends are communicated by a communication path 137, and a fluidized resin material is injected from a gate not shown to integrally mold the flange portion 103 and the valve portion 104 on the first intermediate molded body 130 to mold a second intermediate molded body 140. At this time, the diametral and axial grooves 112, 114; 116, 118 provided on the sides of the first and second convex portions 107, 108 of the first intermediate molded body 130 are filled with a resin material to mold diametral and axial protrusions 113, 115; 117, 119.

Locating of the first intermediate molded body 130 within first and second molds 132, 134 is carried out as follows: An outer periphery of a cylindrical portion 131 of the first intermediate molded body 130 is fitted into an inner periphery of a recess 133 provided in the first mold 132 to carry out a diametral locating, and an end on the side of the valve portion 104 of the cylindrical portion 131 is brought into contact with a shoulder portion 138 formed at one end of the recess 133 to carry out an axial locating. In this axial locating, the first end 105 of the first intermediate molded body 130 is axially pushed in by a keep convex portion 139 provided in the second mold 134 and the second end 106 of the first intermediate molded body 130 is pressed against the shoulder portion 138.

At the position of the keep convex portion 139 is supported a part very close to the inside diameter of the first end 105 of the first intermediate molded body 130. This keep recess 139 has a pin-like shape, there are disposed a plurality of them in a circumferential direction, in this embodiment, three, and in the second intermediate molded body 140, a recess 141 is formed at a position corresponding to the keep convex portion 139.

Figure 12C:
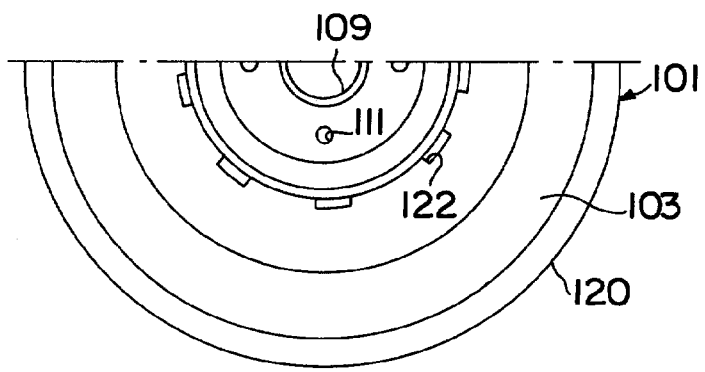

The shape of the keep convex portion 139 is not limited to a pin-like shape but may be, for example, a circular shape as shown in FIG. 12c.

Figure 13F:
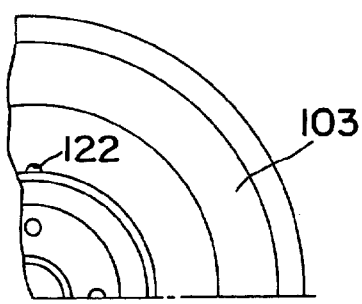

Subsequently, the inner and outer peripheral portions of the second intermediate molded body 140 are shaved out and cuts are formed in the inner and outer peripheral portions of the first intermediate molded body 130 to mold a bellows portion 102 as shown in FIGS. 13e and 13f.

In the shaving out of the inner peripheral portion, not only a resin connecting portion 142 corresponding to a communication path 137 for connecting the flange portion 103 and the valve portion 104 is shaved off to separate the flange portion 103 from the valve portion 104 but also the inside diameter end of the first intermediate molded body 130 is molded by shaving off half of the recess 141. Accordingly, the recess 122 at the inside diameter end within the flange portion of the completed resin bellows 101 has a cut shape opened to the internal space.

Next, the function of the resin bellows in the embodiments shown in FIGS. 11 and 12 will be described.

Figure 14:
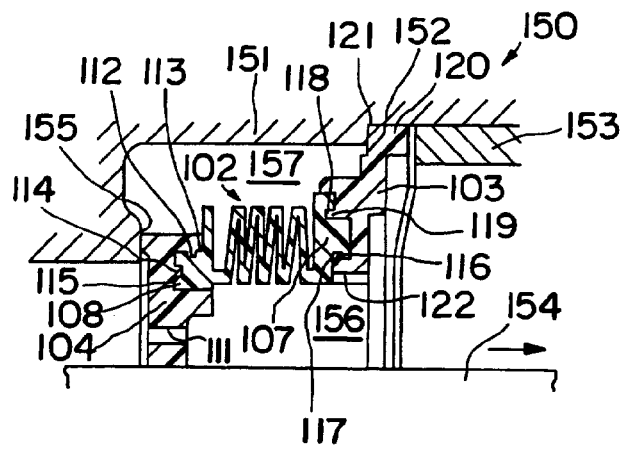
FIG. 14 is a view showing a structural example of a control valve using the resin bellows shown in FIGS. 11a to 11c.
Figure 18:
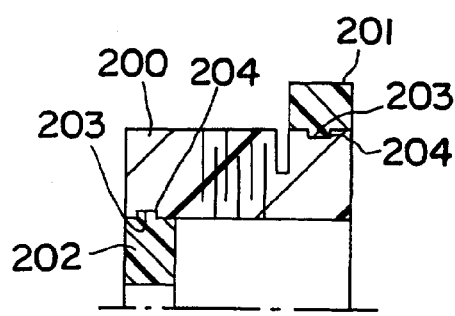
FIG. 18 is a view showing a conventional resin bellows.

This resin bellows is used, for example, for a valve device as shown in FIG. 14.

That is, a valve device 150 has a hollow housing 151, a flange portion 103 of the resin bellows 1 is secured to be held to a shoulder portion 152 provided on the inner wall of the housing 151 by means of a keep member 153, a shaft 154 is secured to a central mounting hole 109 of the valve portion 104 to be a free end, and the shaft 154 is reciprocated to move the valve portion 104 to and from a valve seat 155 provided internally of the housing 151 to open and close the valve. The annular bead 121 provided on the flange portion 103 is provided to increase a contact pressure relative to the shoulder portion 152.

The resin bellows 101 separates a first chamber 156 within the resin bellows 101 when the valve is closed from a second chamber 157 surrounded by the outer periphery of the resin bellows 101 and the inner wall of the housing 151, for which are required a sealing property with respect to fluids such as air and liquid, particularly a sealing property in a connecting surface between the bellows portion 102 and the valve portion 104 and between the bellows portion 102 and the flange portion 103.

In the embodiment shown in FIGS. 11 to 12, since the flange portion 103 and the valve portion 104 as the second resin portion have a configuration so as to envelope inner and outer peripheries of the first end 105 and the second end 106 of the bellows portion 102 as the first resin portion, the length of the connecting surface is longer than the conventional resin bellows, resulting in a complicated construction so that fluid is hard to leak.

Even if, for example, the flange portion 103 and the valve portion 104 are relatively inflated with respect to the bellows portion 102 due to a difference in thermal expansion between the bellows portion 102, and the flange portion 103 and the valve portion 104 to form a clearance in the side on the outside diameter side, the contact pressure of the connecting surface of the side on the inside diameter side acts in an increasing direction. Further, even if the flange portion 103 and the valve portion 104 are relatively contracted with respect to the bellows portion 102 to form a clearance in the side on the inside diameter side, the contact pressure between the connecting surfaces of the side on the outside diameter side increases not to impair a sealing property.

Particularly, in the embodiment shown in FIGS. 11 and 12, in the case where the bellows portion 102 is inserted to mold the flange portion 103 and the valve portion 104, the keep recess 122 as a trace of the keep convex portion for keeping the bellows portion 102 is positioned at the inside diameter end of the connecting surface, and so, no possible seal leak occurs and a sealing property is high as compared with the case where the keep recess 122 is present halfway of the connecting surface. The keep recess 122 may be provided at the position of the outside diameter end from the viewpoint that an opening is not formed halfway of the connecting surface.

Figure 15A:
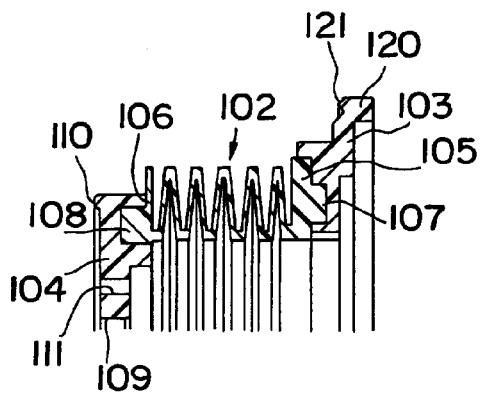
FIGS. 15a through 15e are views showing various modes of a connecting surface between bellows, and a flange portion and a valve portion.

Such function and effect as described can be obtained basically, also in the case where the diametral grooves and diametral protrusions 116, 117; 112, 113 and the axial grooves and axial protrusions 114, 115; 118, 119 are not provided, as shown in FIG. 15a.

However, as in the embodiment shown in FIG. 11, the diametral grooves and diametral protrusions 116, 117; 112, 113 and the axial grooves and axial protrusions 114, 115; 118, 119 are provided between the connecting surfaces of the bellows portion 102, and the flange portion 103 and the valve portion 104 whereby the length from the inside diameter end to the outside diameter end of the connecting surface becomes long and the connecting surface becomes a complicated shape, resulting in a higher sealing effect.

Here, the diametral grooves and diametral protrusions 116,117;112, 113 also have a secure connection function. If it is a simple secure connection, the diametral groove 112, 116 need not be an annular groove extending over the whole periphery of the bellows portion 102 but will suffice to be partly formed in a circumferential direction. A sealing-property function is also provided by the provision of the annular groove.

The axial grooves 114, 118 are provided to control the diametral relative displacement, particularly useful to control the relative displacement caused by the thermal expansion.

Figure 15B:
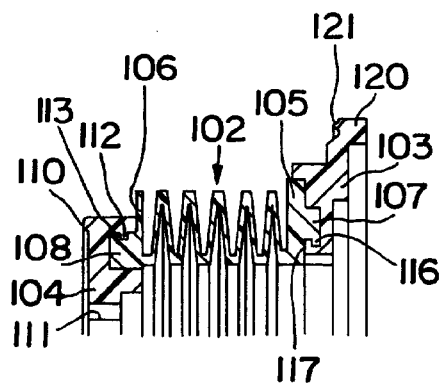
Figure 15C:
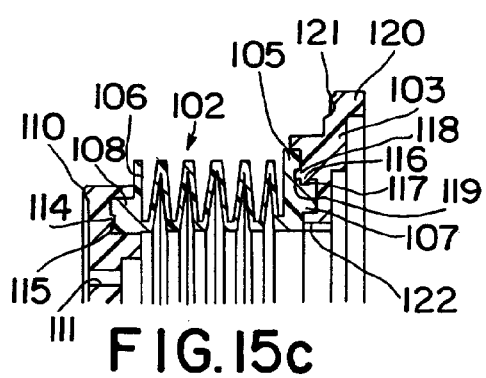

In the case where the connecting surface is connected by three surfaces, the inner and outer sides and the end of the end of the bellows portion, in a sense that the connecting surface is made long and complicated, only the diametral grooves and diametral protrusions 112, 113; 116, 117 as shown in FIG. 15b, or only the axial grooves and axial protrusions 114, 115; 118,119 as shown in FIG. 15c may be employed.

In the case where both the diametral grooves and diametral protrusions 116, 117; 112, 113 and the axial grooves and axial protrusions 114, 115; 118, 119 are provided, even if the connecting surface is not configured to surround both inside and outside diameter sides and the end at the end of the bellows portion, two surfaces, either inside or outside diameter side and the end, may be used for connection.

Figure 15D:
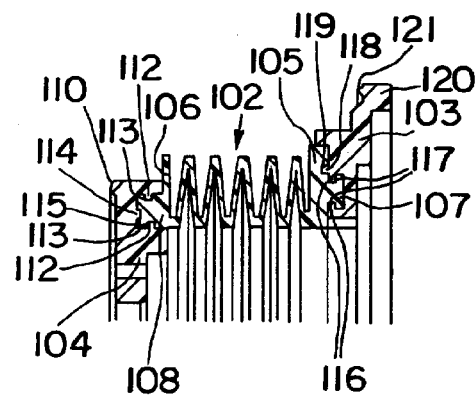

It is of course that the number of the diametral grooves and diametral protrusions and the axial grooves and axial protrusions formed in the connecting surface between the first and second ends 105, 106 and the flange portion 103 and the valve portion 104 of the bellows portion 102 is voluntary. For example, as shown in FIG. 15d, a configuration may be employed in which each pair of the diametral grooves and diametral protrusions 112, 113 and a single axial groove and axial protrusion are provided on the sides of the first and second ends 105, 106, and various other combinations may be employed.

Figure 15E:
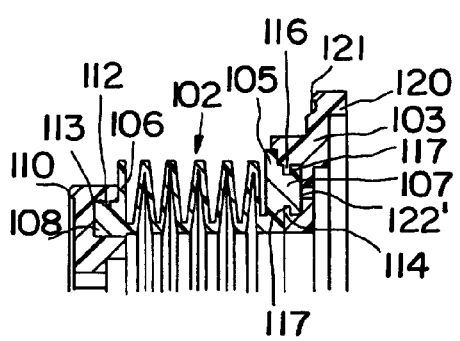

As shown in FIG. 15e, the keep recess 122' may be positioned halfway of the connecting surface. With this configuration, a seal leak occurs at the halfway portion. The inner and outer seal surfaces substantially have the length from the halfway portion to the outside diameter end, but the sealing property can be secured by the provision of the diametral groove or the diametral protrusion 116, 117 therebetween or a diametral groove or a diametral protrusion not shown.

Next, a measure to counter swelling of the flange portion 103 and the valve portion 104 resulting from a fluid, for example, fuel such as gasoline, oil, water, alcohols such as methanol and ethanol will be described.

That is, when used under the atmosphere of fuel such as gasoline, oil, water, methanol and ethanol and under the high humidity atmosphere, the resin material for the flange portion 103 and the valve portion 104 are swelled, and a clearance between the connecting surfaces relative to the bellows portion 102 is produced so that an air leak occurs in the clearance.

As to the first measure, it is considered that the swelling characteristic is positively utilized.

That is, in the case where even the resin such as PA which tends to be swelled, if three surfaces, the inside and outside sides and the end of the first and second ends 106, 106 of the bellows portion 102, are surrounded, the flange portion 103 and the valve portion 104 are relatively swelled with respect to the bellows portion 102 to form a clearance on the outside diameter side. Even so, the contact pressure of the connecting surface on the inside diameter side acts in an increasing direction. Further, even if the flange portion 103 and the valve portion 104 are relatively contracted with respect to the bellows portion 102 to form a clearance on the inside diameter side, there can obtain the effect that the contact pressure between the connecting surfaces on the outside diameter side increases, and the sealing property is not impaired.

As shown in FIGS. 11 and 15, the diametral protrusions 113, 117 and the axial protrusions 115, 119 in engagement with the diametral grooves 112, 116 and axial grooves 114, 118 are swelled within the grooves to increase the contact pressure relative to the groove wall, and they come into close contact therewith to improve the sealing property.

Figure 16A:
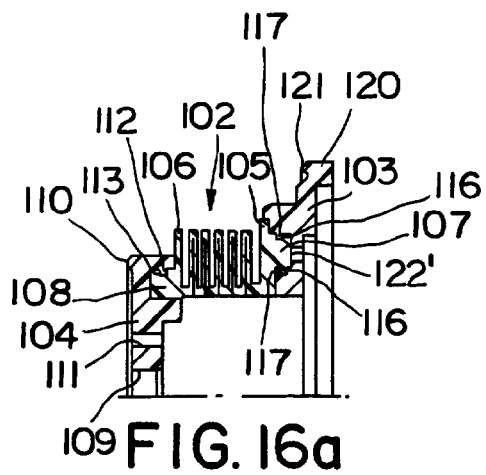
FIGS. 16a through 16g are explanatory views showing the state for obtaining a sealing effect by swelling.

For example, as shown in FIG. 16a, by the provision of the paired diametral grooves and diametral protrusions 112, 113; 116, 117 on the inside and outside diameter sides, an occurrence of a clearance in the interface resulting from the deformation when the resin material is swelled can be suppressed. That is, the air leak can be prevented by making use of the loose-prevention of the bellows body and the flange portion 103 and the valve portion 104 as the injection material, and the surface pressure within the groove in the axial swelling.

It is considered however that from the volume of the flange portion 103 and the valve portion 104 as the injection material, the change in dimension of the outside diameter before and after the oil resistance test and the wet resistance test is 0.4 to 0.5 mm, and a clearance caused by deformation in the interface occurs.

Figure 16B:
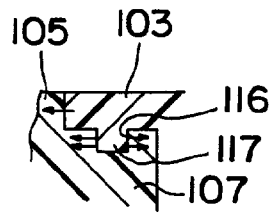
Figure 16C:
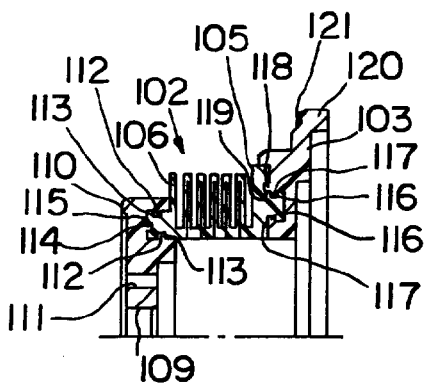
Figure 16D:
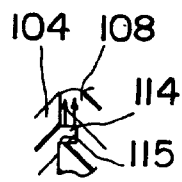

Hence, it is effective to add not only the diametral grooves and diametral protrusions 112, 113; 116, 117 but also the axial grooves and axial protrusions 114, 115; 118, 119 as shown in FIG. 16b. Even with respect to the axial protrusions 115, 119, the swelling occurs in the axial grooves 114, 118 to increase the contact pressure relative to the groove wall, thus further improving the sealing property.

According to the experiment, in the case of only the diametral grooves and diametral protrusions 112, 113; 116, 117, when an air leaking amount is measured under internal pressure of 1 kgf/cm2, it is 300 cc/min. However, if the axial grooves and axial protrusions 114, 115; 116, 117 are provided at two locations, a surface pressure occurs in the groove side due to the swelling of the resin material in the diametral direction to reduce the air leaking amount. According to the data of the air leaking amount in the case where the axial grooves and axial protrusions 114, 115; 116,117 are added, it was reduced to 16 cc/min.

Figure 16E:
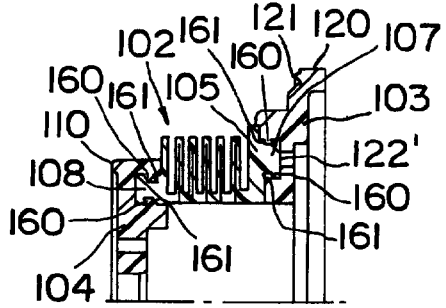
Figure 16F:
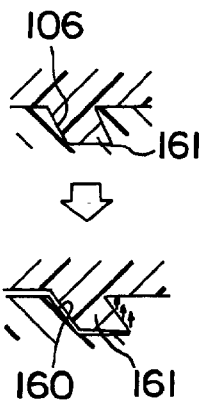
Figure 16G:
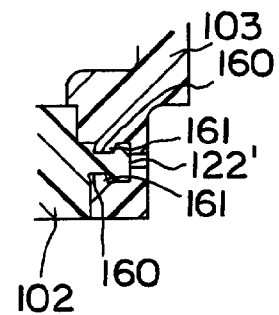

Instead of providing the axial grooves and the diametral grooves as described above, in the illustration, oblique protrusions 161 fitted in an oblique groove 160 and an oblique groove 160 having a predetermined angle to an axial direction and a diametral direction may be provided in the inner and outer peripheries of the first and second convex portions 107 and 108 between the connecting surfaces of the flange portion 103, and the valve portion 104 and the bellows portion 102, as shown in FIGS. 16e and 16f. By doing so, a clearance can be formed in a diametral direction during swelling as shown in FIG. 16g, but a surface pressure occurs on the opposite side, as shown in FIG. 16g. If an oblique shape is employed as such, the same effect as the provision of the axial grooves and diametral grooves is obtained, and the processing of only the oblique groove 160 will suffice, thus reducing the number of processing steps.

Alternatively, the oblique groove 160 and the oblique protrusion 161 may be inclined opposedly each other in the inner and outer peripheries as shown in FIG. 16e or may inclined in the same direction as shown in FIG. 16h.

The second measure for the swelling is to use a material which is inirnum in swelling. An ester resin or a fluorine resin is preferable as previously mentioned.

Tables 1, 2 and 3 listed below show the test results how the air leaking amount to the interface portion due to the influence caused by the swelling changes depending on the kind of resin materials for the flange above-mentioned portion 103 and the valve portion 104.

The tests include the M15 dipping test and the moisture resistance test M15 is one in which methyl alcohol is mixed with Fuel C (toluene and isooctane are mixed in the weight ratio of 1:1, which is used in place of gasoline) in the weight ratio of 100:15.

Figure 17A:
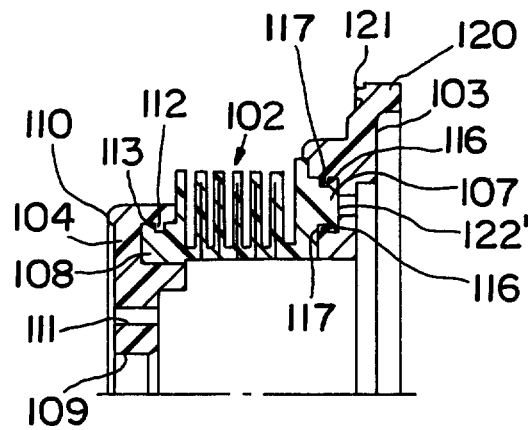
FIGS. 17a through 17c are views showing a sample used in an experiment.
Figure 17B:
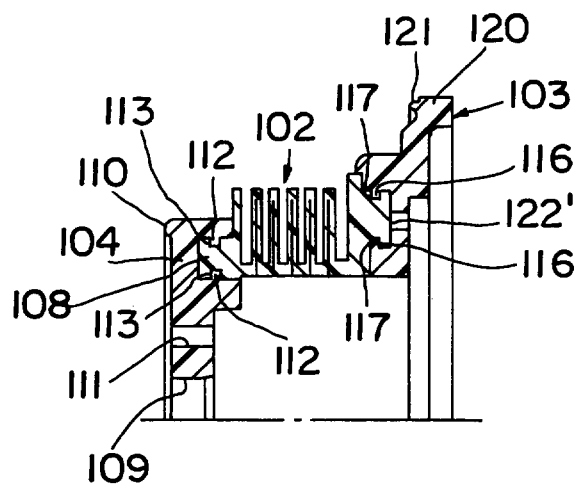
Figure 17C:
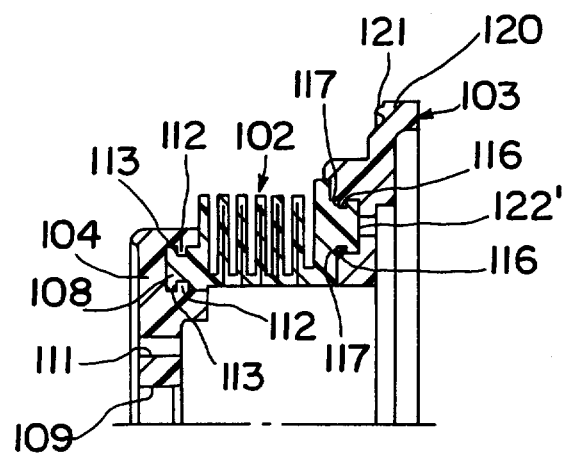

For the tests, three types of resin bellows as shown in FIGS. 17a, 17b and 17c were prepared.

Tables 1, 2 and 3 show the air leaking amounts of the resin bellows of the types in the case where as the resin material for the flange portion 103 and the valve portion 104, 6-6 nylon is used, the case where PBT is used, and the case where PFA is used, respectively.

The resin bellows used in the test of Table 1 is that as shown in FIG. 17a, a pair of diametral grooves and diametral protrusions 116, 117; 116, 117 on the inside and outside diameter sides are provided on the side of the flange portion 103, and the keep recess portion 122' is located halfway of the connecting surface. Further, on the side of the valve portion 104, the diametral groove 112 and the diametral protrusion 113 are provided only outside.

The resin bellows used in the test of Table 2 is that as shown in FIG. 17d, the diametral groove 112 and the diametral protrusion 113 are added on the inside diameter side on the side of valve portion 104 of the bellows shown in FIG. 17a.

The resin bellows used in the test of Table 3 is that as shown in FIG. 17c, the construction is the same as a sample shown in FIG. 17b except that PFA is used as the material for the flange portion 103 and the valve portion 104.

In the M15 dipping test, the resin bellows as samples were dipped in the M15 for a predetermined period of time, and thereafter, a predetermined internal pressure of 1 kgf/cm2 was applied to the resin bellows to measure an air leaking amount Actually, the test was conducted under the conditions of 40° C.×72 hrs in M15→80° C.×2 hrs in air →25° C.×2 hrs or more in air.

In the moisture resistance test, the resin bellows as samples were placed under the atmosphere of high humidity for a predetermined period of time, and thereafter, an internal pressure of 1 kgf/cm2 was applied into the resin bellows to measure the air leaking amount. Actually the test was conducted under the condition of 50° C.×95% (humidity)×240 hrs.

As shown in Table 1, in case of 6-6nylon, the air leaking amount increases for both the M15 and moisture resistance tests. However, in the case where PBT and PFA are used, the air leaking amount considerably reduces, and the interface between the bellows portion, and the flange portion and the valve portion was maintained substantially in the initial state.

While in the above-described embodiment, the flange portion and the valve portion as the second resin portion are connected to both ends of the bellows portion as the first resin portion, it is to be noted that for example, only the flange portion or only the valve portion may be connected to one end of the bellows portion.

Further, while an example of the case where the valve device is used has been described, it is to be noted that this is not limited to the valve but can be used for various devices such as a pressure sensing portion of a pressure switch, a pressure regulator, pump, etc. The second resin portion is not limited to the flange portion and the valve portion.

Furthermore, while a description has been made of shapes such that as in the flange portion or the valve portion, it protrudes radially inwardly or outwardly from the cylindrical shape so that when PTFE is shaved out, a yield becomes bad, it is to be noted naturally that that can be applied to the same or nearly the same inside and outside diameter of the first resin portion as that of the second resin portion.

In the present specification, the resin having a bending resistance herein means the resin durable against the fatigue. The bellows portion of the bellows is subjected to a forced change such as a tension, a bending and the like from the expansion and contraction. The resin durable against such an external force is called the resin having a bending resistance. Examples of the resin having a bending resistance include PTFE, nylon, and various elastomers.

Further, as resin materials for injection molding, ester resins, for example, such as PBT and PET are suitable, and fluorine resins capable of being injected include PFA, ETFE, FEP and PVDF.

In the resin with less stress relaxation, the "less stress relaxation" means that when fixed to a mating element, creep is hard to occur and a clearance is hard to produce whereby a sealing property is maintained.

TABLE 1

AIR LEAKING AMOUNT AT INTERFACE PORTION (cc/min)

| Sample No. | First time | After M15 dipping test | After moisture resistance test |
|---|---|---|---|
| 1 | 2.8 | 75.0 | 87.6 |
| 2 | 0.1 or less | 105.0 | 271.2 |
| 3 | ↑ | 86.3 | 162.5 |

* Internal pressure 1 kg/cm2 (Injection material: nylon)

TABLE 2

AIR LEAKING AMOUNT AT INTERFACE PORTION (cc/min)

| Sample No. | First time | After M15 dipping test | After moisture resistance test |
|---|---|---|---|
| 1 | 0.1 or less | 6.3 | 0.5 |
| 2 | ↑ | 9.2 | 0.7 |
| 3 | ↑ | 3.6 | 0.8 |

* Internal pressure 1 kg/cm2 (Injection material: PBT)

TABLE 3

AIR LEAKING AMOUNT AT INTERFACE PORTION (cc/min)

| Sample No. | First time | After M15 dipping test | After moisture resistance test |
|---|---|---|---|
| 1 | 2.9 | 3.5 | 2.8 |
| 2 | 0.3 | 1.2 | 1.0 |
| 3 | 0.2 | 2.3 | 0.5 |

* Internal pressure 1 kg/cm2 (Injection material: PFA)

I claim:

1. A method for manufacturing a bellows comprising;
    forming a tubular hollow molded body having first and second ends with a first resin having a bending resistance;
    inserting said hollow molded body into a mold;
    injecting a second resin with less stress relaxation than said first resin into the mold on the first end of said hollow molded body through a connecting path, and on the second end of said molded body to mold a bellows intermediate including portions of said second resin molded on said ends of said hollow molded body connected by a portion of said second resin molded in said connecting path;
    removing the portion of sail second resin molded in the connecting path from said bellows intermediate; and
    cutting said hollow molded body to form a bellows portion of said bellows.

2. The method for manufacturing a bellows according to claim 1, wherein engaging portions for said second resin are provided on both ends of said hollow molded body.

3. The method for manufacturing a bellows according to claim 1, wherein said connecting path is on an inner peripheral side of said hollow molded body.

4. The method for manufacturing a bellows according to claim 1, wherein said connecting path is on an outer peripheral side of said hollow molded body, and the second resin is allowed to flow to as not to enter an inner peripheral side of said hollow molded body.

\* \* \* \* \*